US012675601B2

(12) United States Patent
Yasari et al.

(10) Patent No.: US 12,675,601 B2
(45) Date of Patent: Jul. 7, 2026

(54) ADAPTIVE DATA COLLECTION IN VEHICLES FOR ENHANCED PRIVACY AND DATA SECURITY

(71) Applicant: Volvo Car Corporation, Gothenburg (SE)

(72) Inventors: Ehsan Yasari, Gothenburg (SE); András Bálint, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 118 days.

(21) Appl. No.: 18/793,369

(22) Filed: Aug. 2, 2024

(65) Prior Publication Data

US 2026/0037648 A1     Feb. 5, 2026

Related U.S. Application Data

(63) Continuation of application No. 18/793,296, filed on Aug. 2, 2024.

(51) Int. Cl.
*G06F 21/62*     (2013.01)
*G06F 21/60*     (2013.01)

(52) U.S. Cl.
CPC ........ *G06F 21/6245* (2013.01); *G06F 21/604* (2013.01)

(58) Field of Classification Search
CPC .................................................... G06F 21/604
See application file for complete search history.

(56) References Cited

U.S. PATENT DOCUMENTS 8,508,353 B2     8/2013   Cook et al.
9,800,557 B2 *   10/2017  Maier ...................... G06F 21/00
(Continued)

FOREIGN PATENT DOCUMENTS

JP     2011232858 A    11/2011
KR     102039130 B1    11/2019
(Continued)

OTHER PUBLICATIONS

Whittaker, "Toyota confirms another years-long data leak, this time exposing at least 260,000 car owners," https://techcrunch.com/2023/05/31/toyota-customer-data-leak-years/?g, May 31, 2023.
(Continued)

*Primary Examiner* — J. Brant Murphy
(74) *Attorney, Agent, or Firm* — Amin, Turocy & Watson, LLP

(57)     ABSTRACT

Techniques for adapting data collection in vehicles for enhanced security and privacy are provided. A computer-implemented method, performed by a data processing device of a vehicle, comprises A computer-implemented method performed by a data processing device of a vehicle, comprises determining whether a context of the vehicle corresponds to a security restricted context associated with one or more restrictions related to data capable of being collected via one or more data collection devices integrated on or within the vehicle and communicatively coupled to the data processing device. The method further comprises, in response to a determination that the context corresponds to the security restricted context, rendering, via an electronic output device located on or within the vehicle and communicatively coupled to the data processing device, notification data informing one or more occupants of the vehicle that the context of the vehicle corresponds to the restricted security context.

20 Claims, 13 Drawing Sheets

(56) References Cited

U.S. PATENT DOCUMENTS

| | | | |
|---|---|---|---|
| 11,189,109 B2 | 11/2021 | Soda et al. | |
| 11,212,443 B2* | 12/2021 | Kuehnle | H04N 5/28 |
| 11,256,827 B2* | 2/2022 | Amico | G06F 21/6227 |
| 11,700,358 B2* | 7/2023 | Kojima | G08G 1/0112 |
| | | | 348/148 |
| 2011/0039528 A1 | 2/2011 | Yi et al. | |
| 2012/0109447 A1* | 5/2012 | Yousefi | B60L 50/00 |
| | | | 701/32.2 |
| 2015/0296042 A1 | 10/2015 | Aoyama | |
| 2018/0186334 A1* | 7/2018 | Munafo | B60R 25/30 |
| 2018/0234431 A1* | 8/2018 | Meredith | H04L 41/28 |
| 2018/0336144 A1* | 11/2018 | Olarig | G06F 12/1433 |
| 2019/0291643 A1 | 9/2019 | Nix et al. | |
| 2020/0111270 A1 | 4/2020 | Sato | |
| 2020/0118355 A1* | 4/2020 | Soda | G08G 1/0133 |
| 2021/0124959 A1 | 4/2021 | Kuehnle et al. | |
| 2021/0127062 A1* | 4/2021 | Kuehnle | H04N 7/183 |
| 2022/0027501 A1 | 1/2022 | Kusko et al. | |
| 2022/0281460 A1 | 9/2022 | Lin et al. | |
| 2022/0297635 A1* | 9/2022 | Fang | B60R 16/023 |
| 2022/0368830 A1 | 11/2022 | Molin | |
| 2023/0138112 A1 | 5/2023 | Gross et al. | |
| 2023/0298407 A1 | 9/2023 | Saitoh et al. | |
| 2023/0316817 A1 | 10/2023 | Fang et al. | |
| 2024/0064274 A1 | 2/2024 | Blank et al. | |
| 2024/0121509 A1 | 4/2024 | Manabe et al. | |

FOREIGN PATENT DOCUMENTS

| | | |
|---|---|---|
| KR | 102458961 B1 | 10/2022 |
| KR | 10-2531869 B1 | 5/2023 |

OTHER PUBLICATIONS

Stecklow, et al., "Tesla workers shared sensitive images recorded by customer cars," https://www.reuters.com/technology/tesla-workers-shared-sensitive-images-recorded-by-customer-cars-2023-04-06/, Apr. 6, 2023.

Verizon Connect, "Dashcams and privacy mode," https://fleet-help.verizonconnect.com/hc/en-us/articles/360047764214-Dashcams-and-privacy-mode, Last Accessed: May 23, 2024.

Non-Final Office Action received for U.S. Appl. No. 18/793,296 dated Jan. 13, 2026, 47 pages.

* cited by examiner

Table 300 – Example Data Mode Settings

| | Data Mode 1 (Regular Mode) | Data Mode 2 (Documentation Mode) | Data Mode 3 (Restricted Mode A) | Data Mode 4 (Restricted Mode B) |
|---|---|---|---|---|
| Collection Settings | Default camera and signal collection | Camera always recording, all signals collected | Limited camera and GPS position activation | Camera and GPS off |
| Storage Settings | Default data storage | Long-term (cloud-based) data storage | Temporary, local data storage | No data storage/ automatic data deletion |
| Transfer Settings | Default data transfer | Continuous data transfer to cloud storage | No data transfer to cloud storage | No data transfer to cloud storage |
| Other Settings | | | Set interior camera to mirror mode | Set interior camera to mirror mode |

FIG. 3

802

SELECTING A DATA MODE REGARDING DATA CAPABLE OF BEING COLLECTED VIA ONE OR MORE DATA COLLECTION DEVICES INTEGRATED ON OR WITHIN THE VEHICLE, WHEREIN THE SELECTING COMPRISES SELECTING THE DATA MODE FROM AMONGST A PLURALITY OF DIFFERENT DATA MODES CONFIGURED FOR THE VEHICLE THAT VARY WITH RESPECT TO ONE OR MORE SETTINGS SELECTED FROM THE GROUP CONSISTING OF: A COLLECTION SETTING THAT CONTROLS COLLECTION OF THE DATA VIA THE ONE OR MORE DATA COLLECTION DEVICES, A STORAGE SETTING THAT CONTROLS STORAGE OF THE DATA VIA A LOCAL MEMORY ONBOARD THE VEHICLE AN/ORD AN EXTERNAL MEMORY, AND A TRANSFER SETTING THAT CONTROLS TRANSFER OF THE DATA TO AN EXTERNAL SYSTEM OR DEVICE

804

CONTROLLING THE COLLECTION, THE STORAGE, AND THE TRANSFER OF THE DATA IN ACCORDANCE WITH THE DATA MODE, AS OPPOSED TO ANOTHER DATA MODE OF THE DIFFERENT DATA MODES, BASED ON THE SELECTING

FIG. 8

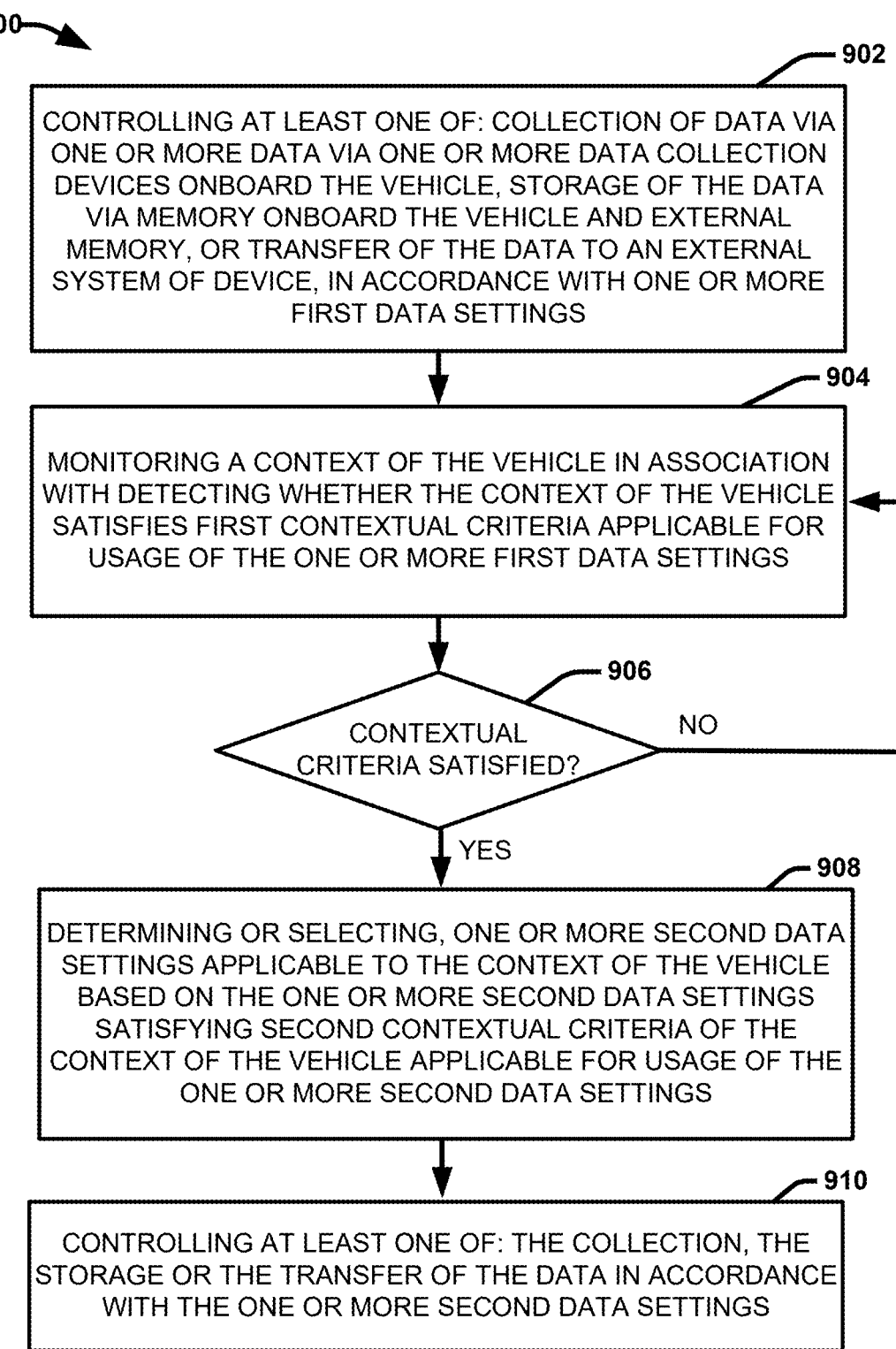

900

902

CONTROLLING AT LEAST ONE OF: COLLECTION OF DATA VIA ONE OR MORE DATA VIA ONE OR MORE DATA COLLECTION DEVICES ONBOARD THE VEHICLE, STORAGE OF THE DATA VIA MEMORY ONBOARD THE VEHICLE AND EXTERNAL MEMORY, OR TRANSFER OF THE DATA TO AN EXTERNAL SYSTEM OF DEVICE, IN ACCORDANCE WITH ONE OR MORE FIRST DATA SETTINGS

904

MONITORING A CONTEXT OF THE VEHICLE IN ASSOCIATION WITH DETECTING WHETHER THE CONTEXT OF THE VEHICLE SATISFIES FIRST CONTEXTUAL CRITERIA APPLICABLE FOR USAGE OF THE ONE OR MORE FIRST DATA SETTINGS

906

CONTEXTUAL CRITERIA SATISFIED?     NO

YES

908

DETERMINING OR SELECTING, ONE OR MORE SECOND DATA SETTINGS APPLICABLE TO THE CONTEXT OF THE VEHICLE BASED ON THE ONE OR MORE SECOND DATA SETTINGS SATISFYING SECOND CONTEXTUAL CRITERIA OF THE CONTEXT OF THE VEHICLE APPLICABLE FOR USAGE OF THE ONE OR MORE SECOND DATA SETTINGS

910

CONTROLLING AT LEAST ONE OF: THE COLLECTION, THE STORAGE OR THE TRANSFER OF THE DATA IN ACCORDANCE WITH THE ONE OR MORE SECOND DATA SETTINGS

FIG. 9

1002

DETERMINING WHETHER A CONTEXT OF THE VEHICLE
CORRESPONDS TO A SECURITY RESTRICTED CONTEXT
ASSOCIATED WITH ONE OR MORE RESTRICTIONS RELATED
TO DATA CAPABLE OF BEING COLLECTED VIA ONE OR MORE
DATA COLLECTION DEVICES INTEGRATED ON OR WITHIN
THE VEHICLE

1004

RENDERING, VIA AN ELECTRONIC OUTPUT DEVICE
LOCATED ON OR WITHIN THE VEHICLE IN RESPONSE TO A
DETERMINATION THAT THE CONTEXT CORRESPONDS TO
THE SECURITY RESTRICTED CONTEXT, NOTIFICATION DATA
INFORMING ONE OR MORE OCCUPANTS OF THE VEHICLE
THAT THE CONTEXT OF THE VEHICLE CORRESPONDS TO
THE RESTRICTED SECURITY CONTEXT

FIG. 10

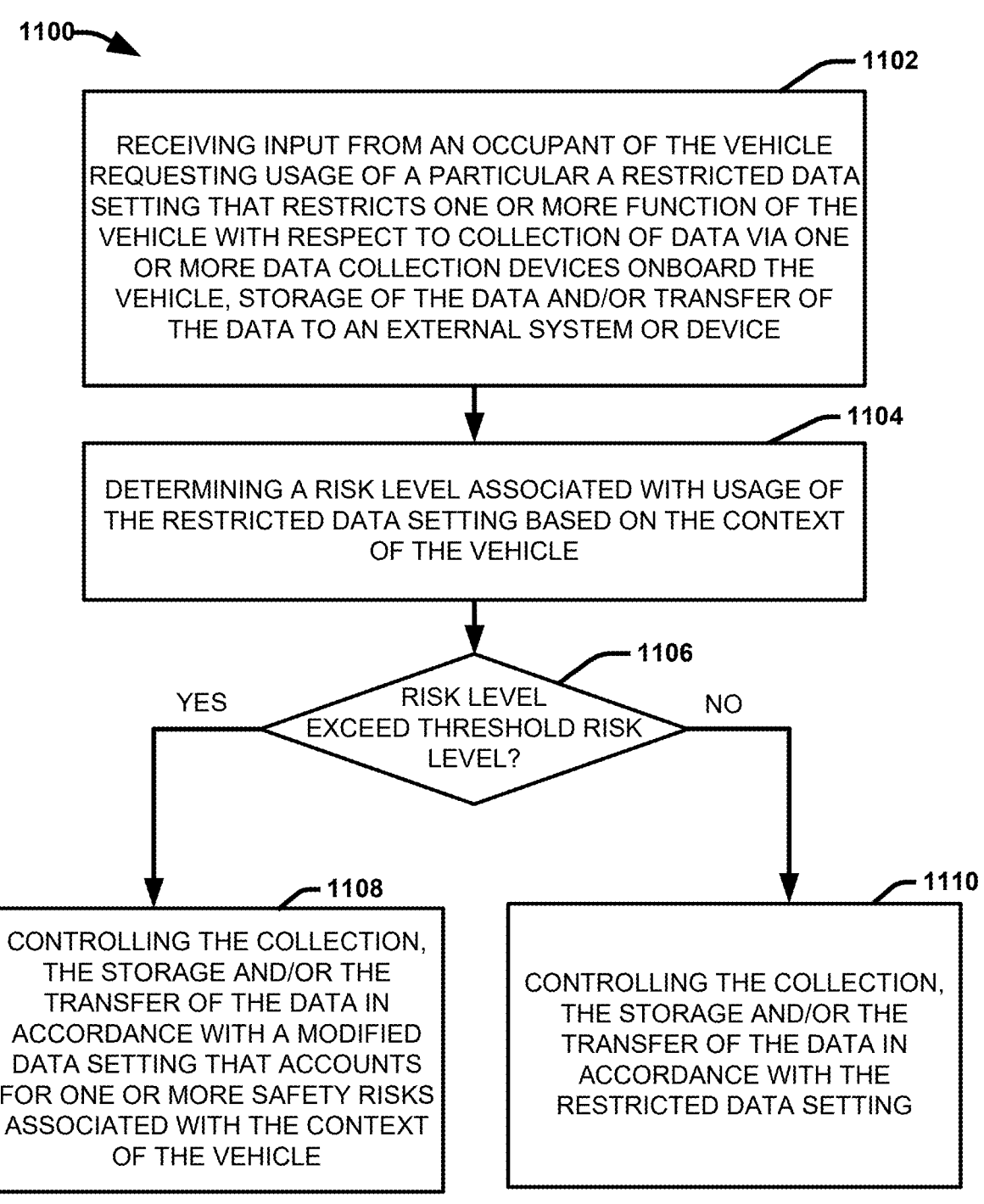

1100

1102

RECEIVING INPUT FROM AN OCCUPANT OF THE VEHICLE
REQUESTING USAGE OF A PARTICULAR A RESTRICTED DATA
SETTING THAT RESTRICTS ONE OR MORE FUNCTION OF THE
VEHICLE WITH RESPECT TO COLLECTION OF DATA VIA ONE
OR MORE DATA COLLECTION DEVICES ONBOARD THE
VEHICLE, STORAGE OF THE DATA AND/OR TRANSFER OF
THE DATA TO AN EXTERNAL SYSTEM OR DEVICE

1104

DETERMINING A RISK LEVEL ASSOCIATED WITH USAGE OF
THE RESTRICTED DATA SETTING BASED ON THE CONTEXT
OF THE VEHICLE

1106

YES      RISK LEVEL
EXCEED THRESHOLD RISK      NO
LEVEL?

1108

CONTROLLING THE COLLECTION,
THE STORAGE AND/OR THE
TRANSFER OF THE DATA IN
ACCORDANCE WITH A MODIFIED
DATA SETTING THAT ACCOUNTS
FOR ONE OR MORE SAFETY RISKS
ASSOCIATED WITH THE CONTEXT
OF THE VEHICLE

1110

CONTROLLING THE COLLECTION,
THE STORAGE AND/OR THE
TRANSFER OF THE DATA IN
ACCORDANCE WITH THE
RESTRICTED DATA SETTING

FIG. 11

ADAPTIVE DATA COLLECTION IN VEHICLES FOR ENHANCED PRIVACY AND DATA SECURITY

TECHNICAL FIELD

The disclosed subject matter relates to vehicles (e.g., transportation vehicles), and more particularly, to adaptive data collection in vehicles for enhanced privacy and data security.

BACKGROUND

The usage of cameras and sensors in cars and other vehicles has contributed significantly to advancements in modern vehicle safety, efficiency and advanced driver-assistance systems (ADAS). However, the usage of cameras and sensors in modern vehicles raises issues related to privacy concerns and data security risks. With respect to the former, cameras within vehicles can potentially infringe on the privacy of occupants. The constant video monitoring of the vehicle interior raises concerns about personal space, especially if the captured image data is accessible to unauthorized entities or misused. On the latter risks, with the increasing connectivity of modern vehicles, the data generated by cameras and sensors is vulnerable to hacking and unauthorized access. This raises concerns about the security of sensitive information and the potential for misuse. Additionally, many private and public areas impart restrictions on the usage of cameras to capture images of the surrounding environment. In such cases, driving a car equipped with cameras may lead to an involuntary breach of laws and consequently legal problems for the driver.

By addressing these security and privacy concerns, the automotive industry can better protect users' data and build trust in the increasingly connected and data-driven world of modern vehicles.

The above-described background relating to security and privacy issues associated with usage of cameras and sensors in modern vehicles is merely intended to provide a contextual overview of some current issues and is not intended to be exhaustive. Other contextual information may become further apparent upon review of the following detailed description.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, systems, devices, computer-implemented methods, apparatuses and/or computer program products are described that facilitate adaptive data collection in vehicles for enhanced privacy and data security.

As alluded to above, techniques for addressing data security and privacy issues related to usage of cameras and sensors in cars and other vehicles are desirable, and various embodiments are described herein to this end and/or other ends.

According to an embodiment, a system onboard a vehicle can comprise a memory that stores computer-executable components, and a processor that executes the computer-executable components stored in the memory. The computer-executable components include a data settings component that selects a data mode regarding data capable of being collected via one or more data collection devices integrated on or within the vehicle, wherein the data settings component selects the data mode from amongst a plurality of different data modes configured for the vehicle that vary with respect to one or more settings selected from the group consisting of: a collection setting that controls collection of the data via the one or more data collection devices, a storage setting that controls storage of the data via the memory and an external memory, and a transfer setting that controls transfer of the data to an external system or device. The computer-executable components further include a control component that controls the collection, the storage, and the transfer of the data in accordance with the data mode, as opposed to another data mode of the different data modes, based on selection thereof by the data mode selection component.

In some implementations, the data settings component selects the data mode in response to reception, via an electronic input device located on or within the vehicle, of user input requesting activation of the data mode. For example, the computer-executable components can further comprise a rendering component that renders information identifying the different data modes via an electronic output device located on or within the vehicle, and wherein the user input comprises selection input selecting the data mode from the information. To this end, the onboard vehicle system can adapt the settings that control collection, storage and/or transfer of data the vehicle as directed by the user.

In other implementations, the computer executable components can comprise a context component that determines and monitors a context of the vehicle, wherein the data settings component selects the data mode based on the data mode being applicable to the context of the vehicle, and wherein the different data modes are tailored to different vehicle contexts. To this end, the onboard vehicle system can adapt the settings that control collection, storage and/or transfer of data the vehicle as needed based on different contexts of the vehicle as they arise. For example, the different vehicle contexts account for different locations and different times and different data security and privacy issues associated with the different locations and/or times. The different vehicle contexts can also account for different occupants of the vehicle and different preferences of the different occupants. For example, in some embodiments, the different data modes comprise at least one user defined data mode tailored to an occupant of the vehicle, and wherein the computer-executable components further comprise a configuration component that facilitates receiving user input from the occupant defining the one or more settings for the user defined data mode.

In various embodiments, the plurality of the different data modes comprises three or more different data modes. The data modes can also vary with respect to sub-settings of the collection setting, the storage setting, or the transfer setting. For example, in various embodiments, the one or more data collection devices comprise one or more cameras integrated on or within the vehicle, and wherein the collection setting comprises one or more camera settings selected from the group consisting of: an activation/deactivation setting that controls activation and deactivation of capture of the image data from respective cameras of the one or more cameras, a capture amount setting that controls an amount of the image data captured from the respective cameras, and capture mode setting that controls a capture mode of the image data captured via the respective cameras. In some implementations of these embodiments, the one or more cameras include an interior camera having a perspective of an interior cabin of the vehicle, and wherein based on the data mode having a camera setting deactivating capture of the image data via the interior camera, the control component configures the interior camera to operate in a mirror mode.

The one or more data collection devices can also comprise a location detection device that collects location data regarding a location and route of the vehicle, and wherein the collection setting controls activation and deactivation of the location detection device and a type of the location data collected. The one or more data collection devices can comprise one or more sensors that collect sensor data associated with the vehicle, and wherein the collection setting controls activation and deactivation of respective sensors of the one or more sensors.

In addition, the storage setting can comprise different storage settings that control whether the data is stored in the memory or not, a duration of time over which the data is stored in the memory, and whether the data is stored in the external memory or not. Further, the transfer setting can comprise different transfer settings that control whether and when the data is transferred to the external system or device, or not transferred to the external system or device, and that control different external systems to which the data is transferred or not transferred.

In some embodiments, the computer-executable components further comprise a safety regulation component that monitors a risk level associated with operation of the vehicle in association with the data mode corresponding to a restricted data mode having one or more data collection settings that deactivate the collection of the data by the control component, and based on a determination that the risk level exceeds a threshold risk level, directs the control component to temporarily override the restricted data mode and activate the collection of the data until the risk level falls below the threshold risk level.

In accordance with one or more additional embodiments, another system onboard a vehicle is described that comprises a memory that stores computer-executable components, and a processor that executes the computer-executable components stored in the memory. The computer-executable components comprise a context component that determines whether a context of the vehicle corresponds to a security restricted context associated with one or more restrictions related to data capable of being collected via one or more data collection devices integrated on or within the vehicle, and a notification component that renders, via an electronic output device located on or within the vehicle in response to a determination that the context corresponds to the security restricted context, notification data informing one or more occupants of the vehicle that the context of the vehicle corresponds to the restricted security context.

In various embodiments, the computer-executable components further comprise a data settings component and a control component. In some implementations, the data settings component selects, in response to the determination that the context corresponds to the security restricted context, a data mode tailored to the restricted security context from amongst a plurality of different data modes configured for the vehicle, wherein the data mode corresponds to a restricted data mode that comprises one or more settings which control at least one of, collection of the data via the one or more data collection devices, storage of the data via the memory and an external memory, or transfer of the data to an external system or device, in accordance with the one or more restrictions. With these implementations, the control component activates the restricted data mode in response to selection thereof by the data settings component, wherein based on activation of the restricted data mode, the control component controls the collection, the storage and the transfer of the data in accordance with the restricted data mode as opposed to another data mode of the different data modes. In other implementations, the computer-executable components can further comprise a recommendation component that generates recommendation data recommending activation of the restricted data mode, wherein the notification component includes the recommendation data in the notification data. With these implementations, the control component can be configured to activate the restricted data mode in response to reception of user input, via an electronic input device located on or within the vehicle, requesting the activation of the restricted data mode. In either of these implementations, the computer-executable components further can comprise an auditing component that tracks information regarding the vehicle context corresponding to the restricted security context and activation and deactivation of the restricted data mode in at least one of the memory or the external memory.

In some embodiments, elements described in connection with the disclosed systems can be embodied in different forms such as a computer-implemented method, a computer program product, or another form.

BRIEF DESCRIPTION OF DRAWINGS

FIG. 3 illustrates a table providing different data modes applicable to a vehicle in accordance with one or more embodiments described herein.

FIG. 8 illustrates a block flow diagram of an example, non-limiting computer-implemented method for adaptive data collection in vehicles for enhanced privacy and data security, in accordance with one or more embodiments described herein.

FIG. 9 illustrates a block flow diagram of another example, non-limiting computer-implemented method for adaptive data collection in vehicles for enhanced privacy and data security, in accordance with one or more embodiments described herein.

FIG. 10 illustrates a block flow diagram of another example, non-limiting computer-implemented method for adaptive data collection in vehicles for enhanced privacy and data security, in accordance with one or more embodiments described herein.

FIG. 11 illustrates a block flow diagram of another example, non-limiting computer-implemented method for adaptive data collection in vehicles for enhanced privacy and data security, in accordance with one or more embodiments described herein.

DETAILED DESCRIPTION

Figure 1:
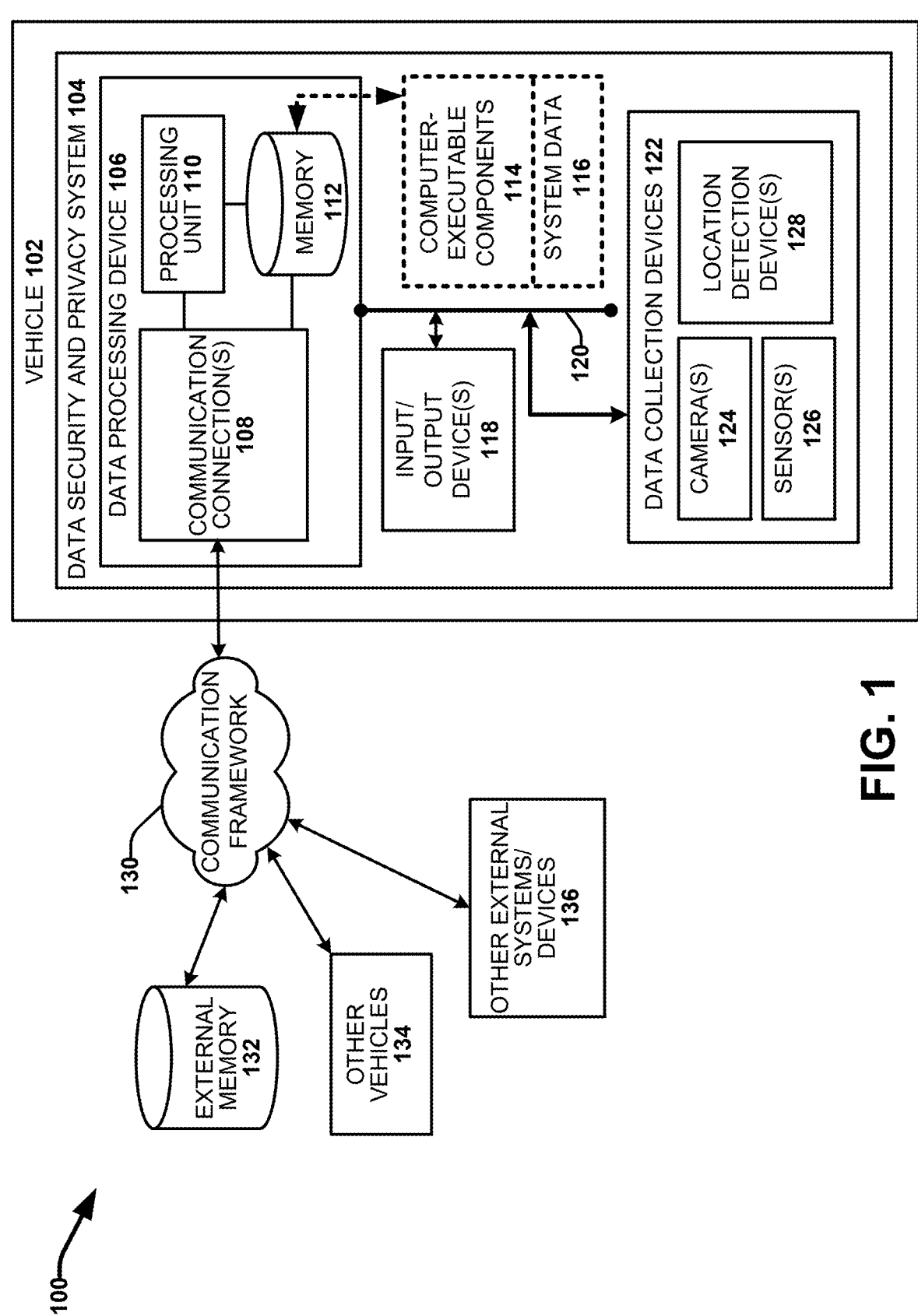
FIG. 1 illustrates a block diagram of an exemplary system that facilitates adaptive data collection in vehicles for enhanced privacy and data security, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

As alluded to above, techniques for addressing data security and privacy issues related to usage of cameras and sensors in cars and other vehicles are desirable, and various embodiments are described herein to this end and/or other ends.

In various embodiments, the disclosed subject matter provides techniques for adapting data collection via respective cameras and sensors located on or within a vehicle automatically based on the context of the vehicle and/or in response to user input requesting application of a particular data collection setting. In this regard, the onboard vehicle computer system can provide different data collection settings that control whether, when and how respective cameras and sensors of the vehicle collect image data (e.g., still image data and/or video data) and sensor data respectively. In various embodiments, the sensor data can include or correspond to location data collected via one or more location detection devices located on or within the vehicle (e.g., global positioning system (GPS) location detection devices, and/or other types of location detection devices). The sensor data can also include other types of sensor data that may be associated with security and privacy issues, such sensor data indicating vehicle speed, vehicle contact and proximity with external objects, vehicle driving patterns, and other information about the usage and environment of the vehicle, as well as the occupants of the vehicle.

The different data collection settings can be tailored to different vehicle contexts which can account for different locations, times and different data collection security and/or privacy restrictions associated with the different locations and/or times. For example, a restricted data collection setting that prevents the collection of image data and location data may be applied when the vehicle is located in an area that prohibits the capture of image data and location data. In accordance with this example, based on detection of the vehicle being located within the restricted area, the onboard vehicle computer system can automatically deactivate collection of image data and location data via the respective cameras and the location detection device while the vehicle is located within the restricted area. The onboard vehicle computer system can further automatically reactivate the collection of image data and location data in response to detection of the vehicle being located outside of the restricted area.

The different data collection settings can also be tailored to user preferences. For example, in some embodiments, users of the vehicle can define and control what data collections settings to be applied under different contexts of the vehicle, wherein the different contexts can be based on location, time, route, weather, occupants of the vehicle, and other contextual variables. Additionally, or alternatively, the onboard vehicle system can allow users of the vehicle to control and adapt the data collections settings via expressly requesting application of a particular data collection setting while using the vehicle. For example, in some implementation, the onboard vehicle system can allow a user of the vehicle to control the data collection settings to be applied by the vehicle in real-time via providing user input (e.g., via a graphical user interface displayed on the vehicle infotainment system display monitor or the like) requesting application of a particular data collection setting.

In addition to data collection, the onboard vehicle system can provide different data storage settings and different data transfer settings that can be adapted automatically based on vehicle context and/or in response to user input. The different data storage settings can control whether the data is stored locally in memory onboard the vehicle and/or externally via an external memory (e.g., in the cloud or the like) or not, the amount of data stored, the duration of time the data is stored, and other restrictions associated with the storage of the data. For example, in one implementation, a restricted data setting can allow for the collection of image data yet prevent the storage of the image data and/or require automatic deletion of the image data after usage thereof for controlling the safe operation of the vehicle. The different data transfer settings can control whether, when and to what external systems or devices image data and/or sensor data is transferred (e.g., via any suitable wired or wireless communication framed) or not. For example, in one implementation, a restricted data setting can allow for the collection and storage of image data locally (e.g., in memory onboard the vehicle) but prevent the transfer of the data to external systems and/or devices. On the other hand, an unrestricted data set may configure the onboard vehicle computer system to regularly or continuously transmit all collected data to an external system or device for storage and/or additional processing.

In this regard, the onboard vehicle computer system can enable configuring a plurality of different data setting configurations that vary with respect to one or more parameters regarding data collection, data storage and data transfer. For example, each of the data collection setting, the data storage setting, and the data transfer setting can include a plurality (e.g., two or more) of different sub-settings represented by different parameters that can control whether, when and how and what data is collected, stored and/or transferred in different ways. To this end, the number of different data setting configurations can include any possible different combination of parameter settings that vary with respect to at least one parameter within at least one of the data collection setting, the data storage setting and the data transfer setting. For example, let us assume each of the data collection setting, the data storage setting and the data transfer setting comprises two different parameter sub-settings, either active or inactive. In accordance with this example, the total number of different possible combinations of different data setting configurations would include eight. However, in various embodiments the number of different parameter sub-settings within each of the data collection setting, the data storage setting and the data transfer setting can include more than two, and thus the total number of different possible combinations of different data setting configurations can be greater than eight.

In some embodiments, the onboard vehicle computer system can provide different, predefined data modes that vary with respect to one or more data settings within the data collection setting, the data storage setting and the data transfer setting. For example, the different data collection modes can include a first data mode, a second data mode, a third data mode, a fourth data mode, and so on. The number of different predefined data modes can vary and generally provide different degrees of security and/or privacy with respect to data collection, storage and/or transfer. For example, the first mode may activate continuous data collection via all data collection devices, and continuous transfer of the data to remote memory storage, while the fourth data mode may deactivate all data collection and prevent all data storage locally and remotely, with the second and third data modes providing different levels of variation between the first and fourth data modes. In some implementations of these embodiments, each of the different data modes can be tailored to different vehicle contexts, wherein the different vehicle contexts are associated with different levels or rigidity regarding data collection, storage and transfer. For example, the first data mode can be applicable to a first vehicle context classification that does not warrant any restrictions on data collection, storage and/or transfer, the second data mode can be applicable to a second vehicle context classification that warrants minor restrictions on data collection, storage and/or transfer, the third data mode can be applicable to a third vehicle context classification that warrants medium restrictions on data collection, storage and/or transfer, and the fourth data mode can be applicable to a fourth vehicle context classification that warrants maximum restrictions on data collection, storage and/or transfer.

To this this end, in various embodiments, the onboard vehicle computer system can determine and monitor the context of the vehicle in association with controlling and adapting the vehicle data collection, storage and transfer settings accordingly. For example, the onboard vehicle computer system can determine the current context of the vehicle and determine the appropriate data settings or data mode applicable to the current context based on predefined information correlating different data setting configurations or different data modes to different vehicle contexts and/or using artificial intelligence. In some embodiments, in response to detection of the vehicle being associated with a context that warrants a change to the current data collection, storage and/or transfer settings being used, the onboard vehicle computer system can notify the driver and/or other occupants of the vehicle. For instance, in furtherance to the restricted area scenario described above, in response to detection of the vehicle being located within the restricted area, the onboard vehicle computer system can notify the driver of the vehicle via rendering a notification via the infotainment system display or the like. The notification can include information informing the driver that the vehicle has entered the restricted area and that a restricted data setting or restricted data mode that accounts for the data collection, data storage and/or data transfer restrictions associated with the restricted area, is recommended for usage. In accordance with this example, the driver can respond to the notification as desired by either electing to apply the restricted data setting/mode or not (or providing other input requesting application of a different tailored setting).

In some embodiments, the onboard vehicle computer system can also track information regarding what data collection, storage and transfer settings are used by the vehicle under corresponding contexts of the vehicle. For example, the onboard vehicle computer system can track whether the appropriate restricted data collection, storage, and/or transfer settings are applied or not when the vehicle context requires or otherwise warrants usage of the restricted setting. To this end, the tracked information can provide a record of compliance (or lack thereof) by the vehicle driver/occupants of any data collection, storage and/or transfer restrictions associated with different locations and/or times (and/or other context-based scenarios), which may be used for various applications (e.g., regulatory compliance evidence and other applications).

The mechanism or mechanisms via which the onboard vehicle computer system determines and monitors the context of the vehicle, and the appropriate data collection, storage and transfer settings for the current context of the vehicle, can vary. In some embodiments, as applied to different locations or areas associated with restrictions on data collection, data storage and/or data transfer, the onboard vehicle computer system can employ mapping data that defines respective restrictions associated with the respective locations or areas. For example, the mapping data can identify various geographical locations, areas and known restrictions regarding data collection, storage and/or transfer associated with the various geographical locations (and/or corresponding known data collection, storage and/or transfer settings that account for the respective restrictions). In some embodiments, the onboard vehicle computer system can employ various machine learning techniques to generate the map data over time. In some implementations, the machine learning techniques can involve capturing and analyzing image data of signs or the like located at or near the restricted areas defining the associated data collection, storage and/or transfer restrictions to learn or infer the appropriate data settings to be applied (e.g., using object and text recognition and the like). In some implementations, the machine learning techniques can employ crowd-sourcing techniques that involve the exchange of information between vehicles regarding identification of restrictions associated with different geographical locations and areas in real-time and updating the mapping information in real-time.

In addition, the disclosed techniques for adapting and controlling the data collection, storage and transfer settings applied by the vehicle can also ensure that the applied data settings do not hinder safety requirements related to usage of the vehicle. In this regard, modern vehicles use image and sensor data to enhance safety through various systems and technologies that monitor the environment, detect potential hazards, and assist or take control to prevent accidents. In some implementations, deactivation of image data and/or sensor data collection may interfere with the ability of various systems of the vehicle (e.g., collision avoidance systems, autonomous driving systems, automatic braking systems, parking assistance systems, driver monitoring systems, etc.) to ensure the safe safety of the vehicle when such systems are in use. Thus, in various embodiments, the onboard vehicle computer system can tailor data collection settings as needed to ensure the data collection settings used do not hinder the safety of the vehicle under and different usage scenarios.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It will be understood that when an element is referred to as being "coupled" to another element (and/or "connected" to another element or variations thereof), it can describe one or more different types of coupling including, but not limited to, chemical coupling, communicative coupling, capacitive coupling, electrical coupling, electromagnetic coupling, inductive coupling, operative coupling, conductive coupling, acoustic coupling, ultrasound coupling, optical coupling, physical coupling, thermal coupling, and/or another type of coupling. As referenced herein, an "entity" can comprise a human, a client, a user, a computing device, a software application, an agent, a machine learning model, an artificial intelligence, and/or another entity. It should be appreciated that such an entity can facilitate implementation of the subject disclosure in accordance with one or more embodiments described herein.

Turning now to the drawings, FIG. 1 illustrates a block diagram of an exemplary system 100 system that facilitates adaptive data collection in vehicles for enhanced privacy and data security, in accordance with one or more embodiments described herein. System 100 comprises vehicle 102, and (optionally) external memory 132, other vehicles 134 and other external systems/devices 136. System 100 further includes a communication framework 130 that communicatively couples vehicle 102, external memory 132, other vehicles 134 and other external systems/devices 136 to one another. Communication framework 130 can include or correspond to any suitable wired or wireless communication framework (e.g., a global communication framework, a local communication framework, etc.) that enables wired and/or wireless communication between the respective systems/devices using any existing or future wired or wireless communication technologies (e.g., cellular, Wireless fidelity (Wi-Fi)), Bluetooth, etc.).

Vehicle 102 (and the one or more other vehicles 134) can correspond to any type of transportation vehicle. For instance, vehicle 102 can include or correspond to any type of motor vehicle (e.g., a car, a truck, a van, a sport utility vehicle (SUV), etc.). In some implementations vehicle 102 can also include or correspond to an aircraft (e.g., an airplane, a helicopter, or the like), a watercraft, or another type of transportation vehicle. In some embodiments, vehicle 102 can include or correspond to an autonomous vehicle or a semi-autonomous vehicle. An autonomous vehicle, also known as a self-driving car or driverless car, is a vehicle capable of navigating and operating without direct human input using a combination of sensors, cameras, radar, lidar, GPS, and advanced software algorithms to perceive their environment, make decisions, and control their movement. The Society of Automotive Engineers (SAE) has defined six levels of automation for vehicles, ranging from Level 0 (no automation) to Level 5 (full automation). Level 5 autonomy refers to vehicles that can operate in all conditions without any human intervention, while lower levels of autonomy require varying degrees of human input or supervision. In this regard, in some embodiments, vehicle 102 can operate in different modes including an autonomous driving mode (e.g., corresponding to Level 5), a no automation mode (e.g., corresponding to Level 0), and a semi-autonomous driving mode (e.g., corresponding to any level between Level 0 and Level 5).

Vehicle 102 includes a data security and privacy system 104 that facilitates adaptive data collection, storage and/or transfer by the vehicle in a manner that provides enhanced privacy and data security. The data security and privacy system can include one or more data collection devices 122, which can include one more cameras 124, one or more sensors 126 and one or more location detection devices 128. The one or more cameras 124 can include one or more cameras located on or within the vehicle 102. In various embodiments, the one or more cameras 124 can include at least one external camera that provides a perspective of the external environment of the vehicle 102 and at least one internal camera that provides a perspective of the internal environment (e.g., the internal cabin) of the vehicle 102. The one or more location detection devices 128 can include or correspond to any suitable device configured to collect (and/or determine) location data regarding the location of the vehicle 102 using any suitable location detection technology. For example, the location detection technology can include (but is not limited to), global positioning system (GPS) technology, cellular triangulation technology, Wi-Fi positioning system (WPS) technology, Bluetooth low energy (BLE) beacon technology, radio frequency identification (RFID) technology, internal measurement unit (IMU) technology, ultrawideband (UWB) technology, acoustic-based location detection technology, and combinations thereof. The one or more sensors 126 can include various types of sensors that can collect sensor data that may be subject to privacy and/or security issues, such as sensor data indicating vehicle speed, vehicle contact and proximity with external objects, vehicle driving patterns, and other information about the usage and environment of the vehicle and the occupants of the vehicle. In this regard, the one or more sensors 126 can include (but are not limited) to, acoustic sensors (e.g., microphones), laser sensors, Light Detection and Ranging (LiDAR) sensors, sonar sensors, audiovisual sensors, perception sensors, motion detectors, proximity sensory, velocity sensors, and the like. Additional examples of the one or more sensors 126 can include (but are not limited to) distance sensors, seats, seat position sensor(s), collision sensor(s), odometers, altimeters, speedometers, accelerometers, vibration meters, moisture sensors, thermometers, seatbelt sensors, wheel speed sensors, a combination thereof, and/or the like.

In some embodiments, one or more of the data collection devices 122 can be physically integrated on or within the vehicle 102 (e.g., physically attached to the vehicle or otherwise configured to remain located on or within the vehicle 102). Additionally, or alternatively, one or more of the data collection devices 122 may be integrated on or within, a mobile device, such as a cellphone, a wearable device (e.g., a watch, googles, glasses, or the like), or the like, associated with an occupant of the vehicle 102 and which may be located on or within the vehicle and communicatively and/or operatively connected to the vehicle 102 (or more particularly the data processing device 106) via any suitable wired or wireless communication technology. With these embodiments, the data processing device 106 can control (e.g., via control component 208, as discussed infra) collection of data by the respective data collection devices in association with connection of the mobile device to the data processing device 106 via any suitable wired or wireless communication technology.

In this regard, the onboard security and privacy system 104 further includes an data processing device 106 (e.g., on onboard computing system of the vehicle 102, a core computer of the vehicle 102, a central or distributed control unit of the vehicle 102, etc.) comprising at least one memory 112 that stores computer-executable components 114 and system data 116 that facilitate various features and functionalities related to controlling data collection (e.g., via the or more data collection devices 122), storage of the data (e.g., via memory 122 and/or external memory 132) and transfer of the data to an external system or device (e.g., external memory 132, other vehicles 134, other external systems/devices 136, and the like) via communication framework 130. The data processing device 106 includes at least one processor or processing unit 110 that executes the computer-executable components 114 stored in memory 112 to carry out the operations/functions described with respect to the corresponding computer-executable components. The computer-executable components 114 and system data 116 are described in detail with reference to FIGS. 2-7. Examples of said memory 112, processing unit 110, and other computer system components that can be included in the data processing device 106 to facilitate the various features and functionalities of system 100 can be found with reference to FIG. 12 (e.g., system memory 1210, processing unit 1204, and the like).

The data processing device 106 can also include communication connections 108. Communication connections 108 refers to the hardware and software employed to connect the data processing device 106 to external systems and devices (e.g., external memory 132, other vehicles 134, other external systems/devices 136) via communication framework 130. Any suitable wired and/or wireless technology can be utilized by the communication connections 106 to enable communication of information between the onboard computer system 104 and external systems and devices. Suitable technologies include BLUETOOTH®, cellular technology (e.g., 3G, 4G, 5G), internet technology, ethernet technology, ultra-wideband (UWB), DECAWAVE®, IEEE 802.15.4a standard-based technology, Wi-Fi technology, Radio Frequency Identification (RFID), Near Field Communication (NFC) radio technology, and the like.

The data security and privacy system 104 can also include one or more input/output devices 118 located on or within the vehicle 102. The input/output devices 118 can include any suitable input device that provides for receiving user input in association with utilizing the various features and functionalities of the data security and privacy system 104 and any suitable output device that provides for rendering information to users. For example, the input/output devices 118 can include any suitable electronic output device such as a display, a speaker, a haptic feedback device, etc. and any suitable electronic input device, such as a touchscreen display, a microphone, a keypad, a keyboard, a camera, and the like. Examples of suitable input and output devices are further provided with reference to FIG. 12 (and input devices 1228 and output device 1236). The data security and privacy system 104 can also include a system bus 120 that couples the respective components thereof (e.g., the data processing device 106, the input/output devices 118 and the data collection devices 122) to one another using any suitable wired or wireless communication technology.

Figure 2:
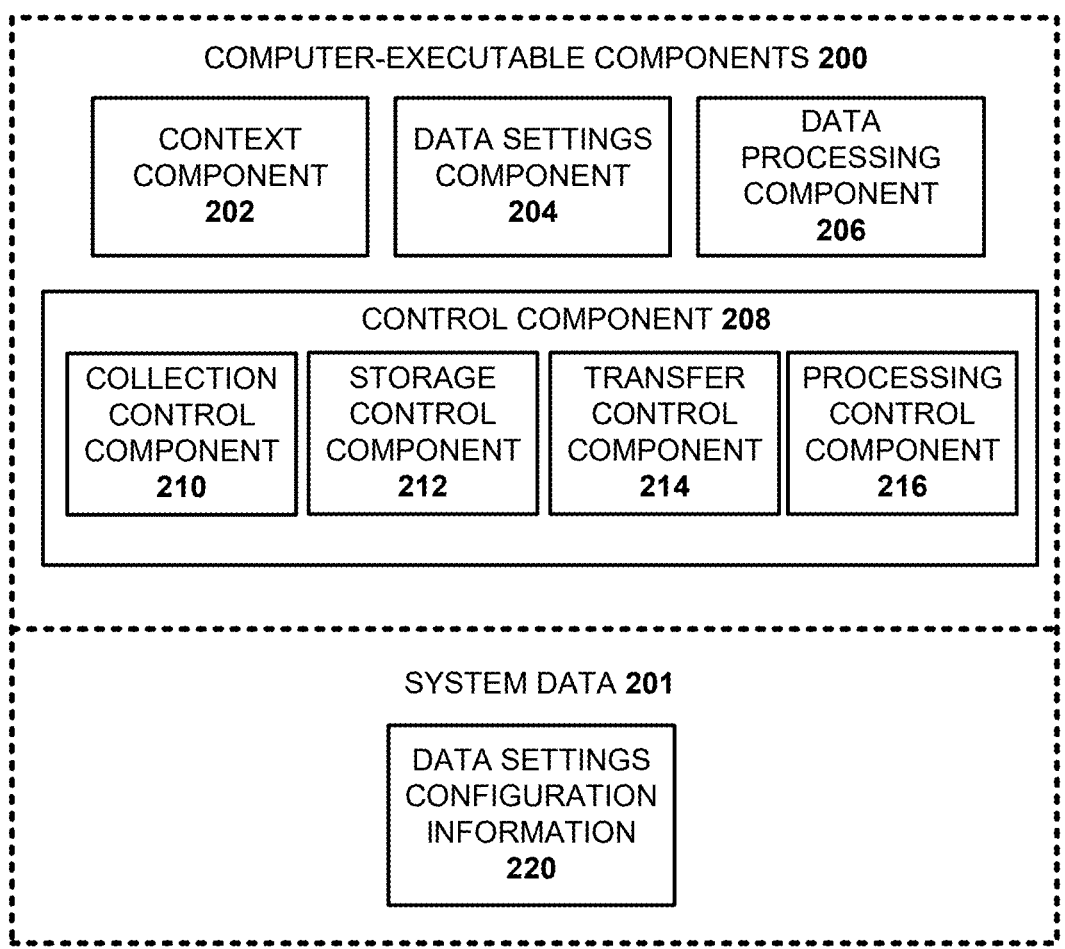
FIG. 2 illustrates example computer-executable components that facilitate adaptive data collection in vehicles for enhanced privacy and data security, in accordance with one or more embodiments described herein.

FIG. 2 illustrates a block diagram of example computer-executable components 200 and data 201 that facilitate various features and functionalities of the data security and privacy system 104, in accordance with one or more embodiments described herein. With reference to FIGS. 1 and 2, computer-executable components 200 and data 201 can correspond to computer-executable components 114 and data 116 respectively. In one or more embodiments, computer-executable components 200 can include (but are not limited to), context component 202, data settings component 204, data processing component 206, control component 208, and configuration component 218, and system data 201 can include data settings configuration information 220.

In various embodiments, context component 202 can provide for determining and monitoring the context of the vehicle 102. In this regard, one or more embodiments of the disclosed techniques are concerned with tailoring the data collection, storage and/or transfer settings used by the vehicle 102 to the current context of the vehicle, wherein the data collection, storage, and/or transfer settings can be adapted and changed accordingly and dynamically as the context of the vehicle changes. In this regard, the data collection setting or setting refers to one or more collection settings that control collection of data via respective data collection devices of the one or more data collection devices 122. The data storage setting or settings refer to one or more storage settings that control storage of the collected data (and/or portions thereof, and/or output data generated as a result of processing the collected data via data processing component 208) via local memory onboard the vehicle (e.g., memory 112) and/or an external memory 132 (e.g., a cloud-based, centralized data storage system or the like). The data transfer setting or settings refers to one or more transfer settings that control transfer (e.g., via communication framework 110 and communication connections 108) of the collected data (and/or portions thereof, and/or output data generated as a result of processing the collected data via data processing component 208) to one or more external systems or devices (e.g., external memory 132, other vehicle 134, and/or other external systems devices 136).

In various embodiments, the context of the vehicle can include or otherwise reflect the location of the vehicle and known or inferred data security and privacy policies regarding data capable of being collected via the one or more data collection devices 122 associated with the location. For example, many different geographical locations or areas (e.g., states, cities, countries, regions, public properties, private properties, etc.) can be associated with different regulatory and/or security policies regarding collection of image data and other data (e.g., location data) via data collection devices corresponding to data collection devices 122. For example, many military bases other types of government properties prohibit usage of cameras on the property and some countries prohibit the transfer of image data and other data collected via data collected within the country to external systems and devices. In another example, certain areas may be associated with higher levels of safety risks relative to other areas. For instance, certain areas may be associated with high levels of traffic incidents and/or crime (e.g., break-ins and other criminal activity) which may warrant continuous collection of image/video data via the external and internal cameras of the vehicle 102 to capture evidence of traffic incidents involving the vehicle and/or surrounding vehicles and other criminal activity.

In accordance with the disclosed techniques, the context of the vehicle however is not limited to location. In this regard, different data collection, storage and/or transfer settings can be tailored as a function of other contextual variables associated with the vehicle environment and usage scenario. For example, in some embodiments, the vehicle context can also reflect time (e.g., time of day, day of week, day of year, etc.) and known or inferred restrictions or preferences regarding data collection, storage and transfer associated with a particular location and time. The context of the vehicle can also account for other contextual factors associated with the external environment of the vehicle 102, such as weather, route, road conditions, and traffic conditions. For example, as applied to traffic conditions, the context of the vehicle can account for the current level of traffic around the vehicle, such as the current number or density of other vehicles around the vehicle, the relative positions of the vehicle to other vehicles, the driving patterns or the vehicle and the other vehicles and so on.

The context of the vehicle can also account for operating conditions of the vehicle. For example, the operating conditions of the vehicle can include or correspond to the operating status or state of the vehicle, such as whether the vehicle is being driven (e.g., with the engine activated) or not being driven (e.g., with the engine deactivated), and whether the vehicle is being charged or not (e.g., as applied to the vehicle 102 being a battery-operated vehicle (BEV)). The operating conditions of the vehicle can also account for a mode in which the vehicle is being driven, such as but not limited to, an autonomous mode, a semi-autonomous mode, a cruise control mode, a highway mode, a city mode, a rural mode, in park, in neutral, in reverse, etc. In some embodiments, the operating status of the vehicle can also reflect an expected duration of time the vehicle is expected to remain in a particular operating status or mode, such as an expected duration of time the vehicle is expected to remain driving on the highway, remain parked at a particular location, and the like. The operating conditions of the vehicle can also account for whether various ADAS are activated and in use by the vehicle 102 that employ image data, location data, and/or other types of sensor data collected via the one or more data collection devices to perform corresponding functions. The operating conditions of the vehicle can also account for a speed at a which the vehicle is being driven, a level of variation to the speed, and other operating conditions of the vehicle 102.

The context of the vehicle can also account for whether the vehicle is involved in a traffic incident or accident or likely to be involved in a traffic incident or accident. For example, in scenarios in which the vehicle is involved in an accident or likely to be, such scenarios may warrant continuous collection of image/video data, location data, speed data, sensor data indicating vehicle contact with external objects, usage of seatbelts, breaking operations, vehicle movement patterns, and so on, to capture evidence related to traffic incidents/accidents involving the vehicle and/or surrounding vehicles and other criminal activity. In another example, the context of the vehicle can account for events and activities associated with the environment of the vehicle at a given time. For instance, such events may include notifications regarding criminal activity associated with the environment, such as an alert regarding a child abduction, a stolen vehicle or another type of activity wherein vehicle location data and image data captured via the external camera of the vehicle and transferred to regulatory authorities in real-time may facilitate remediating the criminal activity.

The context of the vehicle can also account the usage scenario of the vehicle, such as whether the vehicle 102 is being used for personal use, professional/work use, ride-sharing use or another defined usage scenario. In this regard, the particular data settings applied regarding capture, storage and/or transfer of image data via the internal and/or external cameras of the vehicle, location data, audio data inside the vehicle (e.g., recorded words spoken/sounds made by occupants of the vehicle, etc.) and other types of sensor data capable of being captured via one or more sensors 128 can vary with respect to the usage scenario of the vehicle. The usage scenario of the vehicle can also account for whether the vehicle is owned by the driver of the vehicle or rented/leased. In some embodiments, the context of the vehicle 102 can also account for the objects or cargo located on or within the vehicle, such as what types of objects the vehicle is transporting, relative positions of the objects about the vehicle, and data security/privacy concerns associated with the objects.

The context of the vehicle can also account for occupants of the vehicle and preferences or conditions regarding data collection, data storage and data transfer with respect to the occupants. For example, in some embodiments, different drivers of the vehicle 102 may have different preferences regarding data collection, data storage and/or data transfer settings to be applied under various defined vehicle contexts. For example, a first driver may prefer usage of a first data mode when the vehicle is being driven under a first context and a second driver may prefer usage of a second data mode when the vehicle is being driven under the first context. In accordance with this example, the first data mode and the second data mode can vary with respect to one or more settings regarding data collection, storage and/or transfer and the first context can be based on one or more contextual factors (e.g., location, time, route, weather conditions, road conditions, traffic conditions, vehicle operating conditions, and other contextual factors discussed herein). In accordance with this example, the data processing device 106 can control (e.g., via control component 208) data collection, data storage and/or data transfer in accordance with the first data mode or the second data mode under the first context based on whether the driver is the first driver or the second driver.

Additionally, the context of the vehicle 102 can account for not only the driver of the vehicle but other passengers of the vehicle. For example, the vehicle context can account for number of other passengers, identities and preferences of the other passengers, and/or characteristics of the other passengers. For instance, different data settings regarding data collection, storage and transfer may be applied for different vehicle contexts that vary with respect to number of other passengers, identities and preferences of the other passengers, and/or characteristics of the other passengers. For example, based on one or more of the passengers being associated with a privacy preference that prefers deactivation of the internal facing camera, the data processing device 106 can deactivate the internal facing camera based on detection of presence of such a passenger within the vehicle 102. In another example, in scenarios in which no passengers aside from the diver are onboard the vehicle, the preferred data collection setting for the internal camera may be to deactivate the internal camera. In another example, a deactivation setting of the internal camera may be defined for passengers of certain identities or having certain characteristics or attributes (e.g., children, government officials, celebrities, etc.). In another example, a particular driver may prefer to have the internal vehicle camera continuously actively capturing image data of the internal cabin of the vehicle when transporting the diver's children (e.g., so as to monitor the safety of the children) yet deactivate the internal camera when the passengers are adults. In some embodiments, the context of the vehicle can also account for the behavior of the occupants and/or the appearance of the occupants. For example, a preferred data collection setting may be defined that deactivates data collection via the internal facing camera when the passengers are behaving in a certain manner (e.g., sleeping, eating, etc.), or appearing in a certain way (e.g., wearing casual attire as opposed to professional attire, wearing make-up as opposed to not wearing make-up, etc.).

To this end, it should be appreciated that the context of the vehicle 102 can account for various contextual variables regarding the external and internal environments of the vehicle, the operations of the vehicle, the usage scenario of the vehicle and the occupants of the vehicle. It should be appreciated that additional contextual factors associated with these categories (and other categories) other than those noted herein are envisioned.

In various embodiments, the context component 202 can determine the context of the vehicle 102 and the data settings component 204 can determine the appropriate data settings regarding data collection, storage and/or transfer applicable to the context. To this end, the disclosed techniques can apply different data settings regarding data collection, storage and/or transfer for different vehicle contexts and dynamically adapt the data settings as the context of the vehicle changes. To this end, in some embodiments, the control component 208 can automatically control activation or usage of the applicable data setting or settings by the vehicle for the given context as determined by and/or selected by the data settings component 204. For example, in response to determining and/or selecting a particular data setting regarding data collection, storage and/or transfer applicable for a current context of the vehicle, the control component 208 can activate usage of the data setting by the vehicle 102. In other words, the control component 208 can control data collection, storage and transfer in accordance with the particular data setting. For example, the control component 208 can include collection control component 210 that controls collection of data via the respective data collection devices in accordance with the current applicable data collection setting or settings. The control component 208 can also include storage control component 212 that controls storage of the data in local memory onboard the vehicle (e.g., memory 112) and/or external memory 132 in accordance with the current applicable data storage setting or settings. The control component 208 can also include transfer control component 214 that controls transfer of the data to external systems/devices (e.g., external memory 132, other vehicles 134, other external systems/devices 136) in accordance with the current applicable data transfer setting.

To facilitate this end, in some embodiments, the data settings configuration information 220 can define different data setting configurations and corresponding vehicle contexts applicable for the different data setting configurations. The different data setting configurations can vary with respect to one or more data collection settings, one or more data storage settings and/or one or more data transfer settings. The different vehicle contexts can also vary with respect to one or more contextual parameters. The number of different data setting configurations and different vehicle contexts can vary and account for any number of variables and desired configurations.

For example, in some embodiments, the data settings configuration information 220 can provide a data collection setting that includes two data collection settings, either data collection by all data collection devices 122 active or all data collection by all data collection devices inactive. However, in other embodiments, the data collection setting can include a plurality of different data collection sub-settings exceeding the two noted above. For example, the data collection setting can include different data collection settings applicable to different data collection devices of the data collection devices 122 and different types of data capable of being collected via the different data collection devices 122.

For instance, the data collection setting can include an image data collection sub-setting that controls collection of image data via respective cameras of the one or more cameras 124, a location data collection sub-setting that controls collection of vehicle location data via the one or more location detection devices 128, and a sensor data collection sub-setting that controls collection of sensor data via respective sensors of the one or more sensors 126. The image data collection sub-setting, the location data collection sub-setting and the sensor data collection sub-setting can also include additional sub-settings that control different aspects of data collection with respect to the different data collection devices and types of data capable of being collected by the different types of data collection devices.

For example, in some embodiments the image data collection sub-setting can further include additional activation/deactivation sub-settings that can be used to selectively and independently control activation and deactivation of collection of image data from different cameras of the vehicle, such as an internal camera and an external camera, and/or various other different cameras located on or within the vehicle. For example, different data setting configurations can include a first configuration that activates image data collection from both the internal and external cameras of the vehicle, and a second configuration that activates image data collection from the external camera yet deactivates image data collection from the internal camera. The image data collection sub-settings can also include other settings that control other aspects of image data collection via the respective cameras. For example, the additional sub-settings can include a capture amount sub-setting that controls an amount of image data captured via the respective cameras 124 (which can vary for different cameras), a capture frequency sub-setting that control a frequency at which image the image data is captured, and/or a capture mode setting that controls a capture mode of the image data capture via the respective cameras in accordance with two or more different capture modes. For example, the capture modes can include or correspond to a still image mode and a video mode. In another example, the capture modes can vary with respect to camera frame rate (e.g., when operated in video mode), camera perspective, image quality and various other image data capture parameters. To this end, the particular amount of image data captured, the particular type of image data captured (e.g., still images or video), the particular frame rate of image data captured, the particular quality of image data captured, and so on, can be tailored, controlled and adapted based on the context of the vehicle.

Similarly, the location data collection sub-setting and the sensor data sub-settings can respectively include additional sub-settings that can be used to selectively and independently control activation and deactivation of collection of location data and sensor data from different location detection devices of the one or more location detection devices 128 and different sensor devices of the one or more sensors 128, the amount of data collected from the respective devices, the type of data collected from the respective devices, the frequency of data collected from the respective devices, and so on.

Likewise, the data storage setting can include different data storage sub-settings that control whether different types of data (e.g., image data, location data, and different types of sensor data) and/or data collected from different data collection devices (e.g., different cameras, different location detection devices, different sensors, etc.) is stored in local memory 112 or not, a duration of time over which the data is stored in memory 112, and whether the data is stored in the external memory 132 or not. Similarly, the data transfer setting can include different data transfer sub-settings that that control whether different types of data (e.g., image data, location data, and different types of sensor data) and/or data collected from different data collection devices (e.g., different cameras, different location detection devices, different sensors, etc.) is transferred to an external system or device or not transferred, when the data is transferred (e.g., with respect to time, frequency, or other defined transfer conditions), and to which external systems and/or devices the data is transferred to or not transferred to.

In this regard, in various embodiments, different data setting configurations can be defined/configured in the data settings configuration information 220 that vary with respect to one or more data collection settings or sub-settings, one or more data storage settings or sub-settings and/or one or more data transfer settings or sub-settings. As noted above, the different data setting configurations can further be tailored to different vehicle contexts which can account for different data security and/or privacy preferences associated with the different vehicle contexts. To this end, in some embodiments, the data settings configuration information 220 can define a plurality of different data setting configurations and the particular vehicle contexts to which each of the different data setting configurations are applicable. The different vehicle contexts can be defined as function of one or more contextual variables that make up the corresponding contexts and/or different context classification types (e.g., context classification type 1, context classification type 2, context classification type 3, and so on) that account for the one or more contextual variables. With these embodiments, the context component 202 can determine the current context of the vehicle and the data settings component 204 can select the applicable data setting configuration from amongst the plurality of different data settings configurations defined in the data settings configuration information 220 that is applicable to the current context, as provided in the data settings configuration information 220. Additionally, or alternatively, the data settings component 204 can determine or infer the appropriate or optimal data collection, storage and/or transfer settings for a given context of the vehicle using machine learning (ML) and/or artificial intelligence (AI) techniques (as discussed in greater detail infra).

For example, in some embodiments, the data collection setting configuration information 220 can provide a plurality of different predefined data modes regarding data capable of being collected via the one or more data collection devices 122. The data settings configuration information 220 can also define the corresponding vehicle contexts for which the respective data modes are applicable. The different predefined data modes can vary with respect to one or more settings and/or sub-settings included amongst the collection setting, the data storage setting and/or the data transfer setting. The number of different data modes can vary and include two or more different data modes. In some embodiments, the number of different data modes includes three or different data modes. Still in other embodiments, the number of different data modes include four or more different data modes.

For instance, FIG. 3 presents a table 300 illustrating four different example data modes in accordance with one or more embodiments of the disclosed subject matter. With reference to FIG. 3 in view of FIGS. 1 and 2, as illustrated in table 300, the four different data modes are respectively indicated as data mode 1 (also referred to as regular mode), data mode 2 (also referred to a documentation mode), data mode 3 (also referred to a restricted mode A) and data mode 4 (also referred to as restricted mode B). Each of the different data modes includes different data settings with respect to data collection, storage and transfer.

In accordance with this example, the regular mode is defined by a default camera and signal collection setting (e.g., wherein signal collection refers to collection of location data signals and sensor data signals), a default data storage setting and a default data transfer setting. For example, the default camera and signal collection setting can correspond to activating camera and signal collection only at times needed for usage of the data by respective active vehicle safety functions, driver assistance functions, autonomous driving functions, semi-autonomous driving functions, parking assistance functions, and other advanced vehicle functions, at the time at which the functions are activated. In some implementations, the default data storage setting can direct the control component 208 (or more particularly the storage control component 212) to store only certain portions of the collected data in local memory and/or external memory for a default duration of time. Likewise, the default data transfer setting can direct the control component 208 (or more particularly the transfer control component 214) to transfer only the certain portions of the data to one or more external systems or devices and/or to transfer the data to external memory in accordance with a defined schedule or on an as needed basis for additional processing. In various implementations, data settings used for the regular mode can correspond to those settings that the vehicle was originally configured to apply and/or those settings that are applicable to vehicle contexts classified as "regular," (which can be based on any suitable contextual criteria). In other words, the data settings component 204 can select the regular mode for usage/activation by the vehicle in association with the context component 202 classifying the context of the vehicle as regular. For example, vehicle contexts classified as regular can include contexts in which the vehicle is not being driven in an area and/or at a time in which data security and/or privacy restrictions are imparted, and/or under which the usage scenario of the vehicle is considered regular and not associated with safety, security restrictions, and/or privacy restrictions or concerns.

The documentation data mode (or data mode 2) provides the most active mode with respect to data collection, storage and transfer. In accordance with this example, the data collection settings set all cameras and other data collection devices 122 to always record/collect all signals, the data storage setting sets storage of the data to be long-term (e.g., cloud based and thus external memory 132) data storage, and the data transfer setting sets data transfer to the long-term data storage to be continuous (or otherwise performed in real-time as the data is collected). In various implementations, the documentation mode can be applicable to vehicle contexts involving vehicular accidents, or scenarios in which there exists a risk level for accidents involving the vehicle or other vehicles surrounding the vehicle. In another example, the documentation mode may be applicable to vehicle contexts associated with criminal activity. In some implementations, the context component 202 can determine when the context of the vehicle corresponds to a certain risk level exceeding a threshold risk level based on the driving operation of the vehicle, the weather conditions, the traffic conditions and other factors, and classify the context of the vehicle as having a high-risk level. The documentation mode can further be applicable for vehicle contexts classified as having the high-risk level.

The third and fourth data modes correspond to different restricted data modes having stronger restrictions on data collection, storage and transfer as compared to the first and second data modes, with the restricted mode B having stronger restrictions relative to restricted mode A. In this regard, restricted mode A sets data collection to correspond to limited camera and GPS position activation (e.g., wherein the limited factor can reflect for the duration and/or frequency of activation, the amount of data collected or the like). Restricted mode B deactivates all camera and GPS data collection entirely. Restricted mode A allows for temporary local data storage (e.g., for a defined temporary period of time), while restricted mode B sets data storage protocol to deactivate data storage and automatically delete all data collected while restricted mode B is activated. Both restricted mode A and B have the same data transfer settings, which prevents transfer of the collected data to cloud storage. In various embodiments, restricted data mode A can be applicable to vehicle contexts involving minor data security and privacy concerns, while restricted mode B can be applicable to vehicle contexts involving major data security and privacy concerns. For example, some vehicle contexts (e.g., based on geographical location, time, and/or various other contextual factors discussed and envisioned herein) may be associated with data restrictions satisfied by restricted mode A while other may be associated with data restrictions satisfied by restricted mode B. In this regard, in some implementations, the context component 202 can classify the context of the vehicle as having a certain restriction classification (based on various defined contextual criteria), such as a restricted A classification or a restricted B classification, and the data settings component can select the appropriate data mode (e.g., restricted mode A or restricted mode B) accordingly.

As shown in table 300, restricted mode A and restricted mode B also include an "other settings" category that defines other settings associated with the respective modes. In this example, the other settings includes a configuration setting that controls the interior camera of the vehicle to be used in mirror mode when the respective restricted modes are activated. In this regard, mirror mode refers to operating the camera in a manner that image data is received and displayed via one or more display monitors located on or within the vehicle, but not recorded or otherwise stored. In various embodiments wherein the one or more cameras 124 comprise an interior camera having a perspective of an interior cabin of the vehicle 102, and wherein based on the data mode being used having a camera setting deactivating capture of the image data via the interior camera, the data mode also direct the control component (or more particularly the collection control component 210) to control the interior camera to operate in mirror mode.

With reference again to FIG. 2 in view of FIGS. 1 and 3, in some embodiments, in addition to (and/or alternative to) tailoring and controlling data settings regarding data collection, storage and transfer based on the context of the vehicle, the data security and privacy system 104 can also tailor and control processing actions to be applied to collected data prior to storage in memory 112 and/or memory 132 and/or transfer to an external system or device. For example, in some embodiments, the raw collected image data, location data and/or sensor data may be processed prior to storage thereof and/or transfer thereof. With these embodiments, whether and what processing actions are performed on what data can be controlled and adapted based on the context of the vehicle. The processing actions may involve filtering the data, transforming the data, encrypting the data, or otherwise modifying the data in some defined way. For example, in some implementations as applied to image data, a data processing setting may be applied that requires blurring faces of people appearing in the image data prior to storage and/or transfer. In another example, a certain context of the vehicle may warrant encrypting data prior to transfer to an external system while another context may authorize transmitting unencrypted data. In addition, certain processing operations may be performed on raw collected data to extract relevant information and/or generate output data. The output data can include a modified version of the original data or another type of output data, such as a classification, a value or another type of output data. For example, image data may be processed using object recognition algorithms to detect and characterize objects appearing in the image data, information regarding relative distance of the objects to the vehicle, information regarding object movement, and so on. For instance, some examples of output data that can be extracted based on processing of image data captured of the internal environment of the vehicle which are relevant and/or used for safety systems of the vehicle include key points of the body (e.g., eyes, nose, shoulders, etc.), distance between a passenger's head and headrest, seat belt status (e.g., belted verses unbelted), seat belt location and angle, and similar types of information.

To this end, in some embodiments, data processing settings regarding various processing actions to be applied to collected data prior to storage and/or transfer can also be configurable and tailored to different vehicle contexts in accordance with the disclosed techniques. For example, in some embodiments, the plurality of different setting configurations/modes defined in the data settings configuration information 220 can vary with respect to whether and what processing actions are to be performed on the original collected data and whether the processed form of the collected data and/or output data generated as a result of the processing actions is to be stored, transferred and conditions regarding storage and transfer thereof (e.g., with respect to storage/transfer device/system, storage duration, transfer timing, and so on). With these embodiments, the data processing component 206 can be configured to perform various defined data processing operations that can be applied to data collected via the data collection devices 122, wherein the data processing operations can vary depending on the type of the data (e.g., image data, location data, and respective types of sensor data). The data control component 208 can further include a processing control component 216 that controls performance of the respective data processing operations as defined for the applicable data setting configuration/mode selected for usage by the vehicle (e.g., by the data settings component 204 based on vehicle context and/or in response to user input).

The mechanism or mechanisms via which the context component 202 determines the context of the vehicle 102 and via which the data settings component 204 determines the appropriate or applicable data settings regarding data collection, storage, transfer and/or data processing, applicable for the given context can vary. As noted above, in some embodiments, the data settings configuration information 220 can define a plurality of different setting configurations or data modes (which vary with respect to one or more data collection, storage, transfer and/or processing settings or sub-settings), and further define the particular vehicle contexts corresponding to each of the different data modes, wherein each of the different data modes are tailored to different vehicle contexts. The different vehicle contexts can respectively be defined in the data settings configuration information 220 as paired with their corresponding data modes as a function of one or more contextual variables and/or a context classification type (of amongst different defined context classification types). With these embodiments, the data settings configuration information 220 can include or correspond to a look-up table that can be used by the data settings component 204 to select the appropriate data settings configuration/mode given the current context of the vehicle as determined by the context component 202.

To facilitate this end, the context component 202 can determine and/or monitor the context of the vehicle 102 in association with operation of the vehicle 102, and in some implementations, when the vehicle is not being driven (e.g., while parked, while charging as applied to BEVs, or another scenario wherein the engine is deactivated). For example, in some embodiments, the context component 202 can continuously determine and monitor the context of the vehicle over the course of operation of the vehicle, thus regularly or continuously updating the current vehicle context in real-time over the course of operation of the vehicle and/or when the vehicle is not being driven. In other embodiments, the context component 202 can be configured to determine the context of the vehicle periodically, in accordance with a defined schedule (e.g., every minute, every five minutes, every fifteen minutes, etc.) and/or in response to defined trigger events or conditions (e.g., start-up of the vehicle, trigger events based on operations of the vehicle, trigger events based on received notifications or communications, and the like).

As discussed above, the context of the vehicle can account for a multitude of different factors associated with the internal and external environment of the vehicle, the operating status of the vehicle, the usage scenario of the vehicle and the occupants of the vehicle. For example, the context of the vehicle can account for the vehicle location, time, route, weather conditions, road conditions, traffic conditions, operating status of the vehicle, operating mode of the vehicle, usage scenario of the vehicle, and various other contextual factors discussed herein. In another example, with respect to occupants of the vehicle, the context information can reflect the number of occupants, the positions of the occupants within the vehicle, the identities of the occupants, and other characteristics of the occupants (e.g., physical appearance characteristics, age, gender, mood, language, etc.). To this end, the mechanism or mechanisms via which the context component 202 determines the context of the vehicle 102 can vary.

In various embodiments, the context component 204 can determine context information regarding the context of the vehicle using data captured via the one or more data collection devices 122. In some implementations of these embodiments in which the current data settings being used prohibits data collection via one or more of the data collection devices 122, the context component 204 can direct the collection control component 210 to temporarily capture data via the corresponding data collection devices as needed for assessing the context, and direct the storage control component 212 to delete the captured data once the context has been assessed. For example, the context component 202 can analyze image data captured of the external environment of the vehicle 102 to determine contextual information about the external environment, such vehicle location information, road conditions, traffic conditions, proximity of the vehicle to other vehicles, identities of external objects, people, buildings and so on. To facilitate this end, the context component 202 can employ various existing or future image processing techniques, such as object detection, facial recognition, text extraction and natural language processing (NLP), simultaneous localization and mapping (SLAM), and the like. The context component 202 can also assess image data and/or sensory data (e.g., sensor data, such as proximity sensor data, contact sensor data, Lidar data, acoustic data, etc.) in association with assessing traffic conditions around the vehicle, such as the amount of other vehicles around the vehicle and relative positions (distances) between the respective vehicles, and relative positions of objects external to the vehicle 102. The context component 202 can also assess image data, acoustic data, and sensory data captured of the internal environment of the vehicle in association with determining information regarding the occupants of the vehicle, such as identities of the occupants, characteristics of the occupants' appearance and behavior of the occupants, and the like.

The context component 202 can determine and monitor the location and route of the vehicle 102 using various existing and future location tracking technologies. For example, in some embodiments, the context component 202 can determine and monitor the location and route of the vehicle using location data collected via the one or more location detection devices and/or by interfacing with a navigation system employed by the vehicle (e.g., which may be executed by a mobile device connected to the vehicle). The context component 202 can also interface with various other systems of the vehicle, such as the vehicle driving system, autonomous navigation system, semi-autonomous navigation system, and other advanced driver assistance systems in association with determining context information regarding the operating status or state of the vehicle. For example, in association with interfacing with the driving system of the vehicle, the context component 202 can determine information regarding vehicle movement, speed, acceleration, deceleration, breaking, and driving mode (e.g., cruise control mode, autonomous driving mode, semi-autonomous driving mode, highway driving mode, etc.).

The context component 202 can also access various other external systems/devices (e.g., network accessible systems/devices, such as those included in other external systems/devices 136) providing information regarding weather conditions, road conditions, traffic conditions, vehicular accidents/incidents, criminal activity and relevant events associated with the current location, route and/or time. For example, in some implementations the other external systems/devices can include a system that provides real-time information regarding the current status and timing of road and traffic conditions associated with the location of the vehicle, the route of the vehicle, weather, current events and activities and so on.

In some embodiments, the context component 204 can employ artificial intelligence (AI) and/or various machine learning (ML) techniques to facilitate determining or inferring the context of the vehicle 102 based on the various sources of input discussed above. To facilitate this end, the context component 202 can employ various types of machine learning techniques for learning explicitly or implicitly. Inferring or learning can employ a probabilistic or statistical-based analysis to infer an action that is to be executed. For example, in some implementations, a support vector machine (SVM) classifier can be employed. Other learning approaches that can be employed by the context component 202 can include usage of neural networks (e.g., including deep neural networks, deep adversarial neural networks, convolutional neural networks, and the like), Bayesian networks, decision trees, a nearest neighbor algorithms, boosting algorithm, gradient boosting algorithms, linear regression algorithms, logistic regression algorithms, k-means clustering algorithms, association rules algorithms, q-learning algorithms, temporal difference algorithm, and probabilistic classification models providing different patterns of independence can be employed. Learning as used herein also is inclusive of statistical regression that is utilized to develop models of priority.

As will be readily appreciated from the subject specification, the subject innovation can employ learning classifiers that are explicitly trained (e.g., via a generic training data) as well as implicitly trained (e.g., via observing user behavior, receiving extrinsic information) so that the learning classifier is used to automatically determine according to predetermined criteria which action to take. For example, SVM's can be configured via a learning or training phase within a learning classifier constructor and feature selection module. A learning classifier is a function that maps an input attribute vector, $k=(k1, k2, \ldots, kn)$, to a probability that the input belongs to a learning class—that is, $f(k)=$probability (class).

For example, as noted above, in some embodiments, the data settings configuration information 220 can pair different data setting configurations or modes with different context classifications. For example, data mode 1 can be applicable to context classification 1, data mode to be applicable to context classification 2, data mode 3 can be applicable to context classification 3, and so on. With these embodiments, the different context classifications and the corresponding data modes reflect different preferences with respect to security and privacy issues as accounted for by the corresponding data settings. The different context classifications can be based on any number of different contextual variables discussed and envisioned herein.

For instance, in furtherance to the example data modes illustrated in FIG. 3 and table 300, let's assume the different data modes defined in the data settings configuration information 220 include the first, second third and fourth data modes defined in accordance with table 300. However, it should be appreciated that the number of different predefined data modes can vary. In accordance with this example, the different data modes generally provide different degrees of security and/or privacy with respect to data collection, storage and/or transfer. For example, in accordance with the example data modes illustrated in table 300, the second data mode sets data collection to be continuous data via all data collection devices, and sets continuous transfer of the data to remote memory storage, while the fourth data mode deactivates all data collection and prevents all data storage locally and remotely, with the first and third data modes providing different levels of variation between the second and fourth data modes. In some implementations of these embodiments, each of the different data modes can be tailored to different vehicle contexts classifications, which can be based on a variety of different contextual factors. For example, in some implementations, the different context classifications can be defined as a regular context, a documentation context, a minor restrictive context and a major restrictive context. In accordance with this example, the context component 202 can classify the current context of the vehicle as one of these four contexts and apply the corresponding data mode applicable to the given context, wherein the basis for each different classification can based on various contextual factors (e.g., location, time (and rules, policies and/or preferences regarding restrictions on data collection, storage and/or transfer associated with the location/time), route, weather, incidents, accidents, likelihood of incidents or accidents, usage scenario, operating conditions, road conditions, occupants of the vehicle, preferences of the occupants regarding preferred restrictions on data collection, storage and/or transfer), and so on.

Additionally, or alternatively, the data settings component 204 can determine or infer the appropriate data settings applicable for a given location and/or time-based context of the vehicle using information accessible to the data security and privacy system 104 defining known geographical areas and their restrictions on data collection, storage and transfer, as described with reference to FIG. 4.

In some embodiments, the data settings component 204 can also employ AI/ML techniques in association with determining the optimal data settings regarding data collection, storage, transfer and/or processing based on the current context of the vehicle as determined or inferred by the context component. With these embodiments, the data settings configuration information 220 may (or may not) provide a plurality of predefined data modes with different settings tied to different vehicle contexts. For instance, as opposed to using the data settings configuration information 220 as an index and selecting a predefined data mode from amongst a plurality of different predefined data modes paired to a current context of the vehicle, the data settings component 204 can dynamically determine or infer and configure a tailored data mode for the current context of the vehicle. For example, the data settings configuration information 220 can provide information identifying all of the different data settings that are configurable by the data security and privacy system 104 for the vehicle 102 (e.g., the different data collection settings or sub-settings, the different data storage settings or sub-settings, the different data transfer settings or sub-settings, and the different data processing settings or sub-settings). The context component 202 can further determine context information regarding a current context of the vehicle, and the data settings component 204 can determine or infer the optimal data settings with respect to data collection, storage, transfer and/or processing for the current context using AI/ML techniques.

To facilitate this end, the data settings component 204 can employ various types of machine learning techniques for learning optimal data settings applicable for a given context of the vehicle explicitly or implicitly. Inferring or learning can employ a probabilistic or statistical-based analysis to infer an action that is to be executed. For example, in some implementations, a support vector machine (SVM) classifier can be employed. Other learning approaches that can be employed by the data settings component 204 can include usage of neural networks (e.g., including deep neural networks, deep adversarial neural networks, convolutional neural networks, and the like), Bayesian networks, decision trees, a nearest neighbor algorithms, boosting algorithm, gradient boosting algorithms, linear regression algorithms, logistic regression algorithms, k-means clustering algorithms, association rules algorithms, q-learning algorithms, temporal difference algorithm, and probabilistic classification models providing different patterns of independence can be employed. Learning as used herein also is inclusive of statistical regression that is utilized to develop models of priority. The data settings component 204 can also employ learning classifiers that are explicitly trained (e.g., via a generic training data) as well as implicitly trained (e.g., via observing user behavior, receiving extrinsic information) so that the learning classifier is used to automatically determine according to predetermined criteria which action to take. For example, SVM's can be configured via a learning or training phase within a learning classifier constructor and feature selection module.

Figure 4:
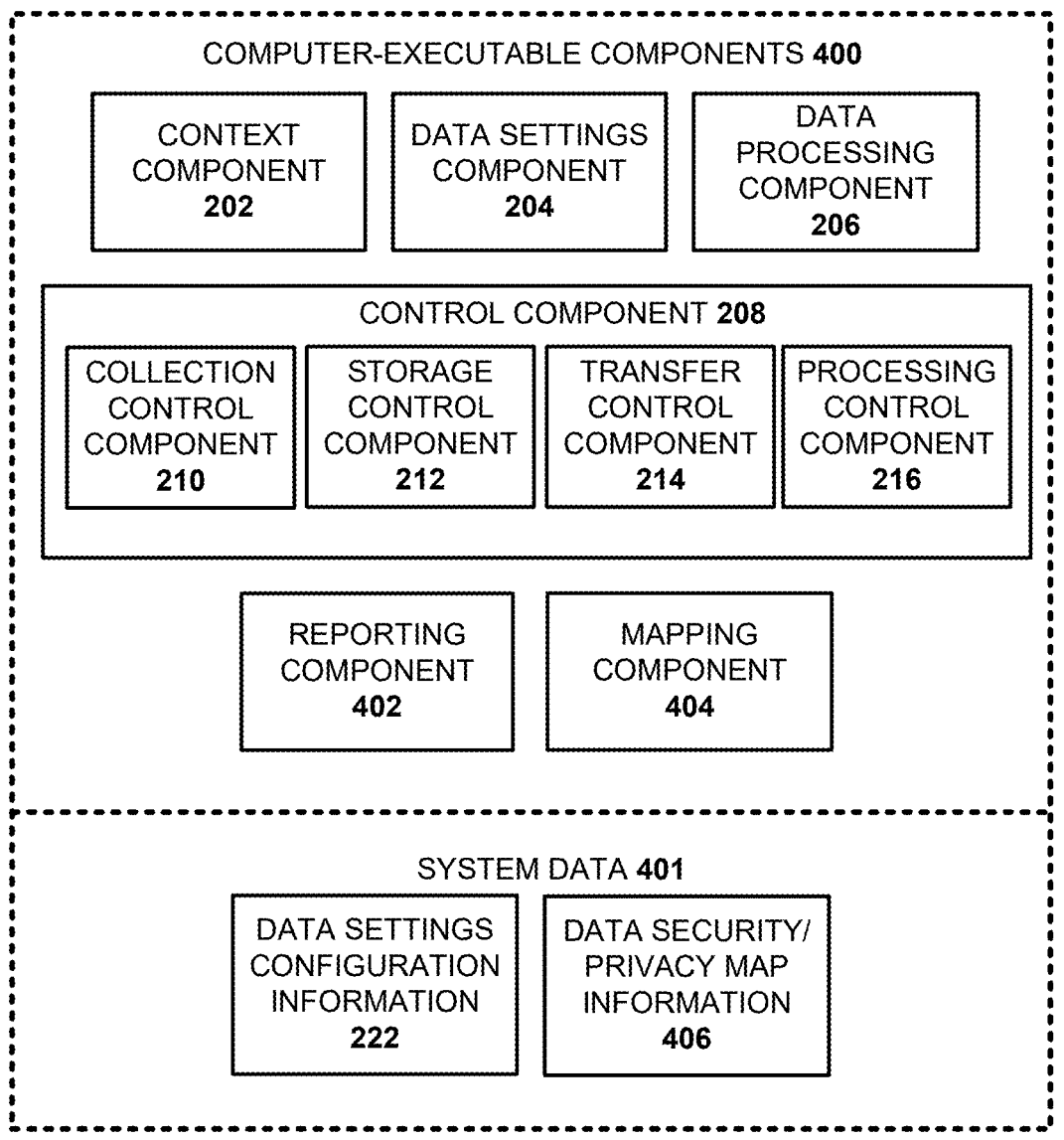
FIG. 4 illustrates additional, example computer-executable components that facilitate adaptive data collection in vehicles for enhanced privacy and data security, in accordance with one or more embodiments described herein.

FIG. 4 illustrates a block diagram of additional example computer-executable components 400 and system data 401 that facilitate various additional features and functionalities of the data security and privacy system 104, in accordance with one or more embodiments described herein. With reference to FIG. 4 in view of FIGS. 1-3, computer-executable components 400 and system data 401 can correspond to computer-executable components 114 and system data 116 respectively. In this regard, computer-executable component 400 different from computer-executable components 200 with respect to the addition of reporting component 402 and mapping component 404 and system data 401 differs from system data with respect to the addition of data security/ privacy map information 406. Repetitive description of like elements employed in respective embodiments is omitted for sake of brevity.

As noted above, in some embodiments, the data settings component 204 can determine or infer the appropriate data settings applicable for a given location and/or time-based context of the vehicle using information accessible to the data security and privacy system 104 defining known geographical areas and their restrictions on data collection, storage and transfer. As illustrated in FIG. 4, this information is referred to data security/privacy map information 406. In this regard, the data security/privacy map information can provide information defining various known geographical areas (e.g., properties, regions, streets/roads, towns, cities, countries, etc.) and known or restrictions on data collection, storage and/or transfer. In some implementations, in addition to, or alternative to including information defining or indicating the known restrictions, the different geographical areas can be paired with data settings information defining the appropriate data settings or data mode applicable to the respective areas that account for their respective restrictions. In some embodiments, the data security/privacy map information 406 can be stored locally onboard the vehicle (e.g., in local memory 112). Additionally, or alternatively, the data security/privacy map information 406 may be stored externally (e.g., in external memory 132 and/or at another network accessible system or device) and accessed by the data security and privacy system 104 via any suitable wired or wireless communication network.

In this regard, in some embodiments, the data security/ privacy map information 406 can include or correspond to indexed information identifying known geographical locations or areas (e.g., properties, towns, regions, etc.) associated with known restrictions regarding data collection, storage, and transfer. In some embodiments, the restrictions may also be conditional as a function of time, (e.g., a certain property may prohibit capture of image data only over certain times frames). With these embodiments, the context component 202 can be configured to monitor the location of the vehicle 102 in association with detecting whether the vehicle is located within an area associated with one or more restrictions (or about to be located within the area given the vehicle's route, movement direction and proximity to the area) as defined in the data security/privacy map information 406. Based on detection of the vehicle being located within a restricted area as provided in the data security/privacy map information 406, the data settings component 204 can determine the appropriate data settings and/or data settings configuration/mode, that accounts for the one or more restrictions associated with the restricted area. For example, assuming an area prohibits collection of image data via respective cameras of the vehicle while located within the area, the data settings component 204 can determine or select a data collection setting for the vehicle that deactivates operation of the one or more cameras and/or sets the cameras to mirror mode. In another example, assuming the restricted area prohibits image data collection and GPS data collection while the vehicle is located in the restricted area on a certain day of the week. In accordance with this example, the data settings component 204 can determine that the appropriate data setting for the vehicle include deactivation of image data and GPS data collection (e.g., in accordance with data mode B as illustrated in table 300 for instance). In this regard, information associated with the respective areas in the data security/privacy map information 406 can expressly indicate the particular applicable restrictions on data collection, storage and/or transfer, and/or indicate the appropriate data settings or data mode that accounts for the restrictions.

In accordance with these embodiments, the data security and privacy system 104 provides a geofencing functionality that adjusts one or more data collection, storage, transfer and/or processing settings automatically based on the vehicle's location using the data security/privacy map information 406. To this end, based on detection of the vehicle being located within (or about to be located within) a restricted area, the control component 208 can activate the corresponding data settings that account for the restrictions imparted by the area on data collection, storage, transfer and/or processing. Once the vehicle is no longer located within the restricted area, the control component 208 can change the data settings accordingly, (e.g., revert to a less restrictive data mode or whatever data mode is appropriate for the new context of the vehicle).

However, one issue with this feature arises in scenarios in which a restricted geographical area restricts location tracking, such as GPS location tracking and/or another type of location tracking. In this regard, the context component 202 can determine when a vehicle enters a geographical area with data restrictions based on the GPS location of the vehicle being within the restricted area and/or near the restricted area with a trajectory or route that indicates the vehicle will enter the restricted area soon (e.g., as accounted for with respect to a threshold time frame or threshold distance). However, if the restricted area requires deactivation of GPS location tracking and/or another type of location tracking (e.g., via one or more corresponding location detection devices 128), determining when the vehicle exits the restricted area (or otherwise is no longer within the restricted area) becomes an issue, as the vehicle's location information is not being collected.

To account for this issue, in some embodiments, various restricted areas can be geofenced using RFID technology. Geofencing with RFID technology involves creating a virtual boundary around a physical area and using RFID tags and readers to monitor and control the movement objects within this boundary. In this regard, in some embodiments, the boundaries of restricted areas can be marked using physical RFID tags distributed at respective vehicle entry and exit points. The one or more sensors 128 of the vehicle can include an RFID reader configured to automatically detect and read the RFID tags in association with movement of the vehicle past the RFID tags. In association with reading the RFID tags, the RFID reader can extract information from the tag indicating the type of restricted area and/or the particular restrictions regarding data collection, storage and/ or transfer imparted by the corresponding area. Additionally, or alternatively, the RFID tags can provide information that uniquely identifies the RFID tag (e.g., a unique identification number or the like), and the data security/privacy map information 406 can include information correlating the unique identifiers with the corresponding geographical areas and associated data setting restrictions. In this regard, the context component 202 can detect when the vehicle enters and exits a restricted area based on detecting passage of the vehicle past or near an RFID tag for the area, the relative position of the vehicle to the RFID tag, known information defining the relative geographical boundaries of the restricted area (e.g., as provided in the data security/privacy map information 406), and tracking the relative movement, distance and trajectory of the vehicle relative to the RFID tags. For example, in some embodiments, the context component 202 can determine and monitor the relative position of the vehicle to an RFID tag marking the boundary of a restricted area based on tracking the distance traveled by the vehicle using speed and motion detection sensor data.

Additionally, or alternatively, in other scenarios in which RFID geofencing technology is not used, the context component 202 can determine when a vehicle exits a restricted area based on the distance traveled by the vehicle following entry into the restricted area exceeding a threshold distance. The threshold distance can be tailored for different areas based on the dimensions of the respective areas. For example, after the context component 202 determines that the vehicle has entered a restricted geographical area (e.g., using GPS technology or another location tracking technology) and the control component 208 deactivates location tracking at this time in accordance with the restrictions imparted by the area, the context component 202 can initiate tracking the distance traveled by the vehicle from this point in time. For example, the context component 202 can determine the distance traveled by the vehicle as a function of the vehicles speed and movement pattern (e.g., as determined via a speedometer data, IMU data, or the like), and determine when the vehicle exits the restricted area based on the distance exceeding the threshold distance (e.g., a general threshold distance or a tailored threshold distance for the area as provided in the data security/privacy map information 406). In some implementations, the context component 202 can also track the relative distance between the vehicle and a reference object or reference point associated with the restricted area. For example, the context component 202 can define a reference object or reference point located at the boundary of the restricted area or within the restricted area. Using motion triangulation techniques and motion data regarding the direction and distance traveled relative to the reference object or point, the context component 202 can determine and track the relative position of the vehicle to the reference object or point. The context component 202 can further determine when the vehicle is not longer within the restricted area based on the distance between the vehicle and the reference point/object exceeding a threshold distance.

In some embodiments, the context component 202 can determine when the vehicle has entered (or is about to enter) an area with on more restrictions on data collection, storage, transfer and/or processing by capturing image data of physical signs associated with the area. For example, many security restricted areas have signs posted at the entry points and/or at various places within the area that indicate policies in effect regarding data collection, storage and/or transfer. For instance, such signs can include signs with text and/or symbols that indicate such restrictions, such as no filming, no photography allowed, no camera usage allowed, no phone usage allowed, and so on. In some embodiments, the context component 202 can use various image processing techniques (e.g., object recognition, text recognition, symbol recognition, etc.) to process image data captured of such signs to automatically determine or infer the restrictions noted by such signs. In some embodiments, the context component 202 can additionally or alternatively employ ML and/or AI techniques to extract or otherwise determine the corresponding restrictions implicated by such signs as appearing in image data captured via the one or more camera 124. For example, the context component 202 can process captured image data of the external environment of the vehicle canned by a supervised deep neural network or another type of machine learning algorithm to identify signs indicating regulations regarding data capable of being collected via the one or more data collection devices and to extract the particular restrictions noted by such signs.

In some implementations, the reporting component 402 and the mapping component 404 can further facilitate generating and updating the data security/privacy map information 406 learned over time over time regarding areas with data setting restrictions as extracted from image data captured of corresponding signs. For example, the mapping component 404 can build and add new restricted areas to the data security/privacy map information 406 once detected by the vehicle in association with the vehicle physically encountering the areas and the corresponding signs. In addition, the reporting component 402 and the mapping component 404 can employ crowd-sourcing techniques to facilitate building and updating the data security and privacy map information 406 over time based on information shared between vehicles using vehicle to vehicle (V2V) communication and/or vehicle to everything (V2X) communication protocols. In this regard, in some embodiments, the reporting component 402 can be configured to share information with other vehicles 134 regarding identified restricted areas and their corresponding restrictions. The reporting component 402 can also receive the same type of information from other vehicles 134 corresponding to vehicle 102. To this end, respective mapping components 404 of the vehicles can update a shared (e.g., network accessible) version of the security and privacy map information 406 over time based on extracted sign data collected globally across different regions, areas, cities, countries, towns and so on.

Figure 5:
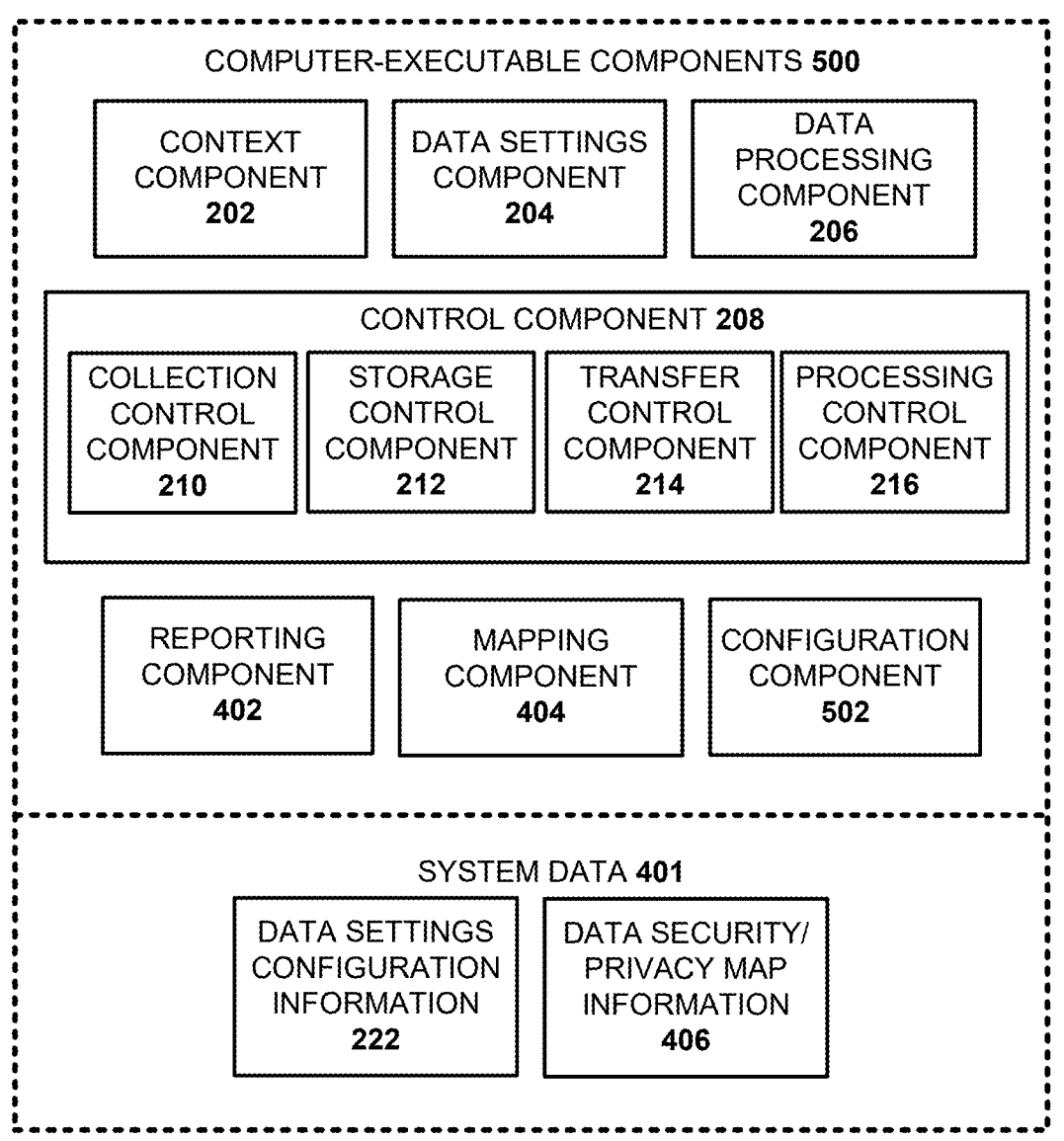
FIG. 5 illustrates additional, example computer-executable components that facilitate adaptive data collection in vehicles for enhanced privacy and data security, in accordance with one or more embodiments described herein.

FIG. 5 illustrates a block diagram of additional example computer-executable components 500 that facilitate various additional features and functionalities of the data security and privacy system 104, in accordance with one or more embodiments described herein. With reference to FIG. 5 in view of FIGS. 1-4, computer-executable components 500 can correspond to computer-executable components 114. In this regard, computer-executable components 500 differ from computer-executable components 400 with respect to the addition of configuration component 502. Repetitive description of like elements employed in respective embodiments is omitted for sake of brevity.

As noted above with reference to FIG. 2, in some implementations, the context of the vehicle 102 can account for the occupants of the vehicle and known preferences of the occupants regarding data collection, storage, transfer and/or processing. In some embodiments, to facilitate this end, the configuration component 502 can provide a configuration tool that enables one or more users of the vehicle to define and/or control data settings regarding data collection, storage, transfer and/or processing as tailored based on the respective user's preferences. For example, the configuration component 502 can provide a configuration application that allows a user of the vehicle (e.g., a driver and/or another passenger) to set up a profile with information tying the user's identity to their profile. The configuration application can provide a graphical user interface (GUI) that includes an interactive configuration tool via which the user can set or define different data settings or data setting configurations/ modes desired for usage by the vehicle 102 and the particular contextual scenarios at which the respective different data settings or data setting configurations/modes are applicable (e.g., a contextual classification, and/or one or more user noted contextual parameters).

The level of granularity or specificity afforded by the configuration tool can account for the various data collection, data storage, data transfer and data processing settings and/or subs-settings described herein and the various contextual parameters described herein (e.g., regarding location, time, route, road conditions, traffic conditions, weather, operating status of the vehicle, usage scenario, occupants of the vehicle, and so on). For example, in some embodiments, the data settings configuration information 222 can provide a plurality of different predefined data modes that may be used by the vehicle, such as those defined in table 300 and/or others. In some implementations, the user can customize the data settings by providing input defining the particular vehicle contexts under which the respective data modes should be used. For example, the configuration tool can allow the user to provide one or more contextual parameters defining the contextual criteria for which the respective data modes are applicable. The contextual parameters can reflect one or more of the various contextual parameters discussed herein or otherwise envisioned herein. Additionally, or alternatively, the configuration tool can allow the user to further customize the predefined data modes and/or generate user defined data modes or data settings.

In some embodiments, the GUI of the configuration component 502 can be displayed via an electronic display located on or within the vehicle, such as an electronic display of the vehicle's infotainment system, a dashboard display device, a center counsel display device, and the like. The GUI can provide for receiving user input via any suitable electronic input device or devices (e.g., a touchscreen, a touchpad, a keyboard, voice recognition input, gesture recognition input, etc.) connected to the configuration component 502 (or more particularly the data processing device 106 that executes the features and functionalities of the configuration component 502). Additionally, or alternatively, the configuration component 502 can be executed by another device connected to the onboard computer system, such as a mobile phone, smartphone, tablet, or the like.

In either of these embodiments, the configuration component 502 can generate or update the data settings configuration information 222 to reflect any user defined data settings and/or profile information, and the data settings component 204 and the control component 208 can control data collection, data storage, data transfer and/or data processing in accordance with the user defined settings and/or profile information. With these embodiments, in association with detection of a particular driver operating the vehicle 102, the data settings component 204 can apply the corresponding data settings customized by driver (e.g., as defined in the data settings configuration information 222). The context component 202 can employ any suitable mechanism to automatically identify the driver (e.g., biometric based identification, such as facial recognition, fingerprint recognition, iris recognition, etc.). Additionally, or alternatively, in association with using the vehicle 102, the driver can provide input verifying their identity and requesting usage of their corresponding customized data settings.

Still in other embodiments, the configuration component 502 can enable any user of the vehicle to control the particular data settings regarding data collection, storage, transfer and/or processing in real-time via providing input while using the vehicle requesting usage of a particular data setting or data mode. For example, while driving the vehicle, the driver of the vehicle or another passenger of the vehicle can provide input requesting usage of a particular data mode or data setting suited to the current context of the vehicle. In other words, occupants of the vehicle can interface with the data security and privacy system 104 (e.g., via any suitable input mechanisms, such as using an input device, voice input, or the like) and direct the system to apply a particular data setting or data mode on the fly, and the control component 208 can activate usage of the requested data setting or data mode. For example, a user may provide input instructing the system to activate and/or deactivate data collection by a particular data collection device of the one or more data collection devices 122 on the fly. In another example, the user can also control whether and when collected data is stored and/or deleted from local memory (e.g., memory 112), whether and when data or portions thereof are transferred to an external system or device, which external systems or devices the data is transferred to, any processing actions to be performed on the data, whether to activate or deactivate mirror mode for the internal camera of the vehicle, and so on, on the fly.

Figure 6:
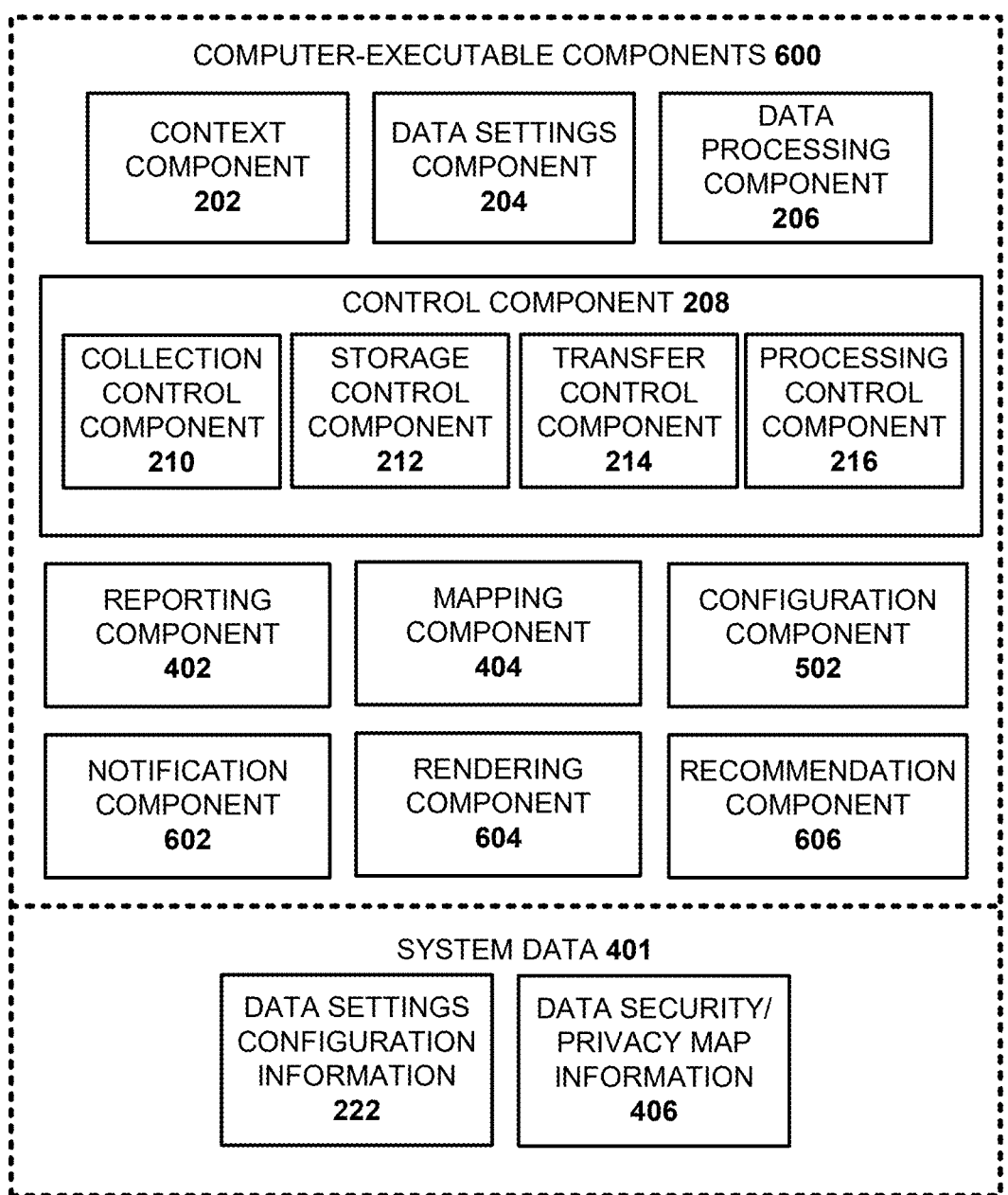
FIG. 6 illustrates additional, example computer-executable components that facilitate adaptive data collection in vehicles for enhanced privacy and data security, in accordance with one or more embodiments described herein.

FIG. 6 illustrates a block diagram of additional example computer-executable components 600 that facilitate various additional features and functionalities of the data security and privacy system 104, in accordance with one or more embodiments described herein. With reference to FIG. 6 in view of FIGS. 1-5, computer-executable components 600 can correspond to computer-executable components 114. In this regard, computer-executable components 600 differ from computer-executable components 500 with respect to the addition of notification component 602, rendering component 604 and recommendation component 606. Repetitive description of like elements employed in respective embodiments is omitted for sake of brevity.

As noted above, in some embodiments, the control component 208 can automatically control usage of a particular data setting or data mode applicable to a current context of the vehicle 102 (e.g., as defined in the data settings configuration information 222) in response to detection of the particular vehicle context. To this end, as the context of the vehicle changes, the control component 208 can automatically (e.g., without user involvement) adapt the data settings regarding data collection, storage, transfer and/or processing accordingly.

In other embodiments, the notification component 602 can notify a user associated with the vehicle regarding detection of a particular context of the vehicle that warrants a change to the current data setting or data mode being used. For example, in response to detection of a new context of the vehicle that warrants changing the current data setting or mode in use by the vehicle while the vehicle is being driven/operated, the notification component 602 can notify the driver and/or other passengers of the vehicle via rending (e.g., via rendering component 604) notification data via any suitable electronic output device located on or within the vehicle (e.g., an electronic display, a speaker, or the like). In some implementations, the notification data can include information indicating the new context of the vehicle. For instance, assuming the new context is based on the vehicle being located within (or about to be located within) a restricted area that prohibits usage of cameras, the notification data can include information indicating that the vehicle has entered a restricted area that prohibits usage of cameras.

In some embodiments, the recommendation component 606 can also recommend the particular data setting or data mode applicable for the new context of the vehicle. For instance, the notification data can also include recommendation data informing the driver and/or occupants of the vehicle regarding the recommended data setting or data mode for usage under the new context. In this regard, in association with detecting a new context of the vehicle that warrants a change to the current data setting or data mode being used, the data settings component 204 can select (e.g., using data setting configuration information 222, data security/privacy map information 406 and the like), or otherwise determine (e.g., using ML/AI techniques) the applicable data setting or data mode tailored to the new vehicle context, and the recommendation component 606 can include information identifying or indicating the applicable data setting or data mode. With these embodiments, in response to receiving such a notification including the recommended data setting or data mode, the data security and privacy system 104 can allow the driver and/or another passenger of the vehicle to respond to the notification with input either directing the system to activate and use the recommended data setting or data mode (or not), and/or to further customize the recommended data setting or data mode as desired by the user. With these embodiments, the control component 208 can be configured to control adapting the data settings used by the vehicle 102 based reception of user input responding to such a notification.

Figure 7:
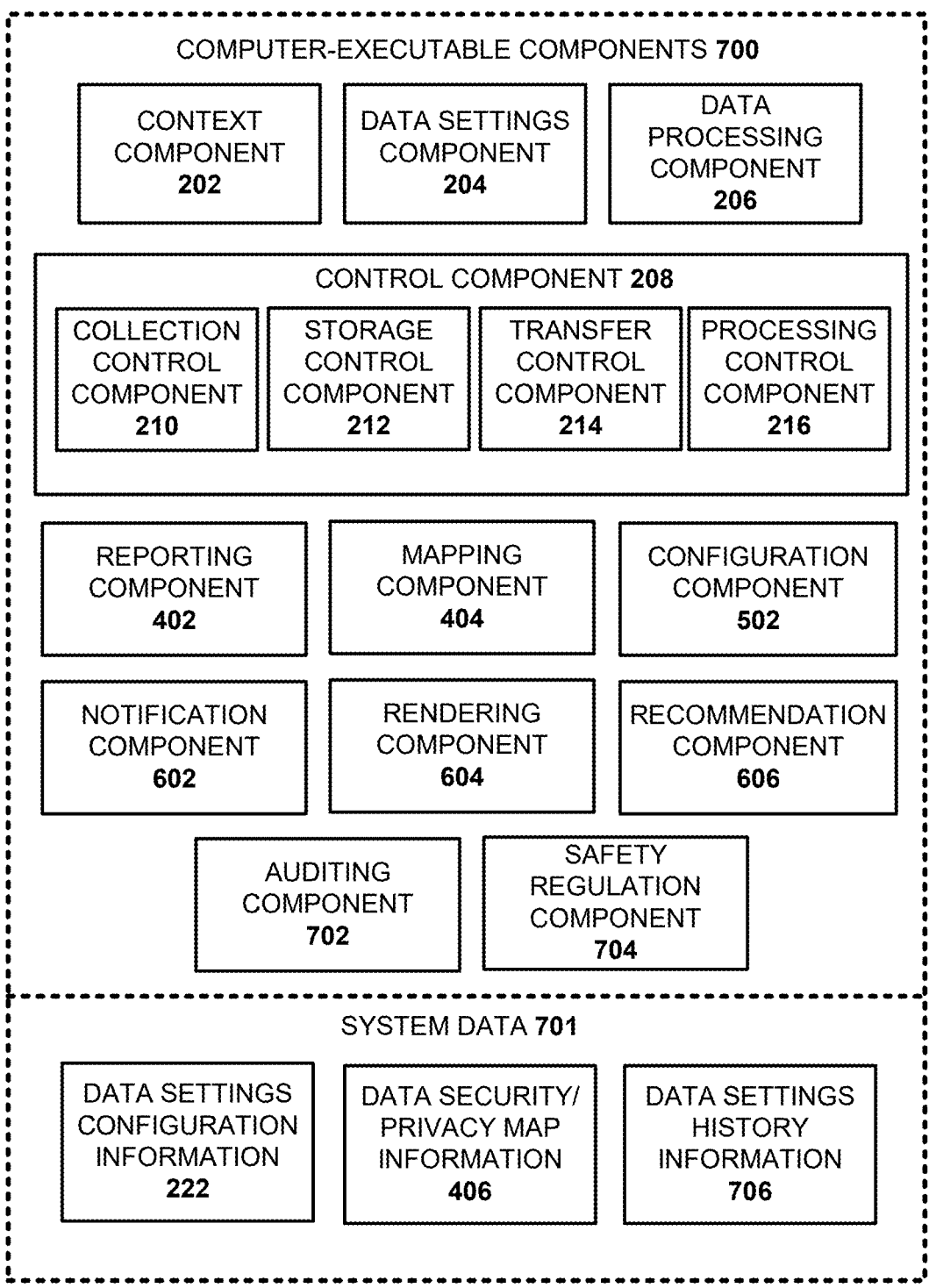
FIG. 7 illustrates additional, example computer-executable components that facilitate adaptive data collection in vehicles for enhanced privacy and data security, in accordance with one or more embodiments described herein.

FIG. 7 illustrates a block diagram of additional example computer-executable components 700 and system data 701 that facilitate various additional features and functionalities of the data security and privacy system 104, in accordance with one or more embodiments described herein. With reference to FIG. 7 in view of FIGS. 1-6, computer-executable components 700 and system data 701 can correspond to computer-executable components 114 and system data 116 respectively. In this regard, computer-executable components 700 differ from computer-executable components 600 with respect to the addition of auditing component 702 and safety regulation component 704 and data 701 different from data 401 with the addition of data settings history information 708. Repetitive description of like elements employed in respective embodiments is omitted for sake of brevity.

In some embodiments, the auditing component 702 can track information regarding what data collection, storage, transfer and/or processing settings are used by the vehicle under corresponding contexts of the vehicle. Such information is represented in FIG. 7 as data settings history information 708. The data settings history information 708 can be stored in local memory onboard the vehicle (e.g., memory 112) and/or external memory 132. To this end, the data settings history information 708 can include information identifying respective context of the vehicle over time (e.g., as function of defined context type classifications and/or one or more contextual parameters) and respective data settings/modes activated under the respective contexts. For example, the auditing component 702 can track whether the appropriate restricted data collection, storage, and/or transfer settings are applied or not when the vehicle context requires or otherwise warrants usage of the restricted setting. In another example, the auditing component 702 can track information regarding data settings or modes recommended by the recommendation component 608 (and included in notification data rendered to the driver and/or other passengers of the vehicle) for a particular context of the vehicle and whether the driver responded to the notification directing the system to apply the recommended data setting/mode or not. To this end, the data settings history information 708 can provide a record of compliance (or lack thereof) by the vehicle driver/occupants of any data collection, storage and/or transfer restrictions associated with different locations and/or times (and/or other context-based scenarios), which may be used for various applications (e.g., regulatory compliance evidence and other applications).

The safety regulation component 704 can provide a safety feature that regulates usage of different data settings regarding data collection, storage, transfer and/or processing inconsideration of safety restrictions associated with the vehicle. In this regard, in various implementations, a particular data mode or data setting selected for usage by the vehicle (e.g., via data settings component 204 and/or in response to user input) may interfere with the safe operation of the vehicle. For example, in some scenarios, the usage of a restricted data mode that deactivates collection of image data, location data, and/or other types of sensor data by respective data collection devices 122 may prevent or inhibit an advanced driver assistance system of the vehicle from performing its functions or performing its functions optimally (e.g., autonomous navigation functions, semi-autonomous navigation functions, lane control functions, back-up control functions, parking control functions, etc.). In another example, the usage of a restricted data mode that prevents transfer of collected data to an external system or device configured to process the data remotely and issues corresponding commands to the vehicle in real-time may interface with the vehicle's ability to navigate and/or operate in a safe manner given the current context of the vehicle (e.g., as function of location, time, weather, road conditions, traffic conditions, operating status of the vehicle, and so on).

In these scenarios, the safety regulation component 704 can control overriding and/or adjusting the data settings as appropriate to account for any safety restrictions applicable to the current context of the vehicle. For example, in some implementations, the safety regulation component 704 can check whether the current context of the vehicle involves any safety restrictions associated with safe operation of the vehicle and whether the currently applied or recommend data setting interferes with the safety restrictions. In response to a determination that the current or recommended data setting interferes with the safe operation of the vehicle, the safety regulation component 704 can direct the control component 208 to employ a modified data setting that accounts for the safety restrictions for the duration of time over which the safety restrictions are applicable. For example, the safety regulation component 704 can direct the control component to temporarily collect the requisite data needed to perform a safety feature of an advance driver assistance system while the system active yet delete the captured data automatically.

To facilitate this end, in some embodiments, the data settings configuration information 222 can also include safety information defining various safety limitations associated with various context of the vehicles, and include information regarding how respective data settings should be overridden or modified to account for the safety limitations. Additionally, or alternatively, the safety regulation component 704 can determine and monitor a risk level associated with the operation of the vehicle when using a data setting or data mode that restricts one or more aspects of data collection, storage, transfer and/or processing. To this end, the safety regulation component 704 can determine the risk level as a function of whether and to what degree the data setting or data mode interferes with the current safe operation of the vehicle given the context of the vehicle (e.g., the operating scenario of the vehicle, the road conditions, the traffic conditions, etc.). The safety regulation component 704 can further direct the control component 208 to temporarily override and/or adapt the data settings as needed based on the risk level exceeding a threshold risk level. The safety regulation component 704 can further continue to determine and monitor the risk level and direct the control component to revert back to the recommended or preferred data settings/mode for the vehicle once the risk level falls below the threshold.

To this end, the risk assessment performed by the safety regulation component 704 can be tailored to the context of the vehicle and account for various contextual factors discussed herein. In this regard, although various advanced driver assistance system of the vehicle 102 may perform optimally with full activation of data collection, storage, transfer and/or processing functions enabled, depending on the context of the vehicle, some advanced driver assistance systems may perform adequately enough to ensure the safe operation of the vehicle with restricted activation of one or more of such data settings or sub-settings. For instance, in some scenarios, an advance driver assistance system of the vehicle may safely perform its functions with limited or restricted data collection (or another restricted setting with respect to data storage, transfer and/or processing) given the location of the vehicle, the amount of traffic around the vehicle, and/or various other factors. In accordance with this example, the risk level associated with the usage of the restricted data setting or mode may not exceed the threshold risk level.

FIG. 8 illustrates a block flow diagram of an example, non-limiting computer-implemented method 800 for adaptive data collection in vehicles for enhanced privacy and data security, in accordance with one or more embodiments described herein. With reference to FIG. 8 in view of FIGS. 1-7, method 800 corresponds to an example computer-implemented method that can be performed by the data processing device 106 of vehicle 102. In this regard, at 802, method 800 comprises selecting (e.g., via data settings component 204) a data mode regarding data capable of being collected via one or more data collection devices integrated on or within the vehicle (e.g., one or more data collection devices 122), wherein the selecting comprises selecting the data mode from amongst a plurality of different data modes configured for the vehicle that vary with respect to one or more settings selected from the group consisting of: a collection setting that controls collection of the data via the one or more data collection devices, a storage setting that controls storage of the data via a local memory onboard the vehicle and/or an external memory, and a transfer setting that controls transfer of the data to an external system or device. At 804, method 800 comprises controlling, by the system (e.g., via control component 208), the collection, the storage, and the transfer of the data in accordance with the data mode, as opposed to another data mode of the different data modes, based on the selecting. In other words, the control component can change how the vehicle performs data collection, storage, and/or transfer by changing the current data settings applied by the other (previously used or currently used) data mode to the data settings applied by the selected data mode.

It should be appreciated that the different data modes can vary with respect to one or more of the various settings and/or sub-settings associated with the data collection setting, the data storage setting, the data transfer setting (and/or optionally the data processing setting), disclosed herein. In this regard, depending on the particular data mode selected, the collection control component 210 can interface with the respective data collection devices 122 (e.g., via system bus 120) and control deactivation and activation of data collection from the respective data collection devices 122 in accordance with the selected data mode. In addition, the collection control component 210 can also control the manner in which the data is collected, the amount of data collected, the type of data collected (e.g., still images verses video), the frequency of data collection, a mode of data collection, and/or other controllable actions regarding data collection, which can vary based on the type, feature and functionalities of the respective data collection devices 122 and the corresponding settings and/or sub-settings defined for the selected data mode. The storage control component 212 can also control storage of the collected data via local memory onboard the vehicle 102 (e.g., memory 112) and/or an external memory (e.g., external memory 132) in accordance with the applicable data storage setting or settings defined for the selected data mode. For example, the storage control component 212 can control whether the data is stored in memory 112 and/or memory 132, what type of data is stored in the memory 112 and/or memory 132, what portions of the data are stored in the memory 112 and/or memory 132, the duration of time over which the data is stored, a storage format in which the data is stored (e.g., a privacy protected format or an unprotected format, an encrypted format verses a non-encrypted format, etc.), and so on. The transfer control component 214 can also control transfer of the data to one or more external systems and/or devices (e.g., external memory 132, other vehicles 134, other external systems/devices 136) in accordance with the selected data mode. For example, the transfer control component 214 can control whether the data is transferred to an external system or device or not, what data is transferred, when the data is transferred, and what external systems and/or devices to which the data is transferred or not, in accordance with the selected data mode.

In some embodiments, in accordance with method 800, the data settings component 204 selects the data mode at 802 in response to reception of user input requesting activation of the particular data mode selected. In other embodiments, the data settings component 204 selects the data mode based on detection, by the context component 202, of the current context of the vehicle changing from a previous context of the vehicle under which the other or previous data mode was being used, wherein the selected data mode is applicable to the current context of the vehicle and the previous data mode is inapplicable to the current context of the vehicle 102.

FIG. 9 illustrates a block flow diagram of another example, non-limiting computer-implemented method 900 for adaptive data collection in vehicles for enhanced privacy and data security, in accordance with one or more embodiments described herein. With reference to FIG. 9 in view of FIGS. 1-7, method 900 corresponds to an example computer-implemented method that can be performed by the data processing device 106 of vehicle 102. In this regard, at 902, method 900 comprises controlling, at least one of: collection of data via one or more data collection devices onboard the vehicle, storage of the data via memory onboard the vehicle and/or external memory, and transfer of the data to an external system of device, in accordance with one or more first data setting (e.g., via control component 208). At 904, method 900 comprises monitoring a context of the vehicle in association with detecting whether the context of the vehicle satisfies first contextual criteria applicable for usage of the one or more first data settings. At 906, based on a determination that the context of the vehicle satisfies the first contextual criteria applicable for usage of the one or more first data settings, the context component continues the monitoring at 904.

However, at 906, based on a determination that the context of the vehicle does not satisfy the first contextual criteria applicable for usage of the one or more first data settings, process 900 continues to 908. In this regard, a 908, process 900 comprises determining (e.g., using AI/ML techniques) or selecting (e.g., via data settings component 206 and using data settings configuration information 220) one or more second data settings applicable to the context of the vehicle based on the one or more second data settings satisfying second contextual criteria of the context of the vehicle applicable for usage of the one or more second data settings. At 910, method 900 further comprising controlling at least one of, the collection, storage or transfer of the data in accordance with the one or more second data settings.

FIG. 10 illustrates a block flow diagram of another example, non-limiting computer-implemented method 1000 for adaptive data collection in vehicles for enhanced privacy and data security, in accordance with one or more embodiments described herein. With reference to FIG. 10 in view of FIGS. 1-7, method 1000 corresponds to an example computer-implemented method that can be performed by the data processing device 106 of vehicle 102. In this regard, at 1002, method 1000 comprises determining (e.g., via context component 202) whether a context of the vehicle corresponds to a security restricted context associated with one or more restrictions related to data capable of being collected via one or more data collection devices integrated on or within the vehicle. At 1004, method 1000 comprises rendering (e.g., via notification component 602 and rendering component 604), via an electronic output device located on or within the vehicle in response to a determination that the context corresponds to the security restricted context, notification data informing one or more occupants of the vehicle that the context of the vehicle corresponds to the restricted security context.

In various embodiments, in accordance with method 1000, in response to the determination that the context corresponds to the security restricted context, method 1000 can further comprise selecting a data mode tailored to the restricted security context from amongst a plurality of different data modes configured for the vehicle, wherein the data mode corresponds to a restricted data mode that comprises one or more settings which control at least one of, collection of the data via the one or more data collection devices, storage of the data via a local memory onboard the vehicle and an external memory, or transfer of the data to an external system or device, in accordance with the one or more restrictions. Method 1000 can further comprise activating the restricted data mode based on the selecting, and controlling, based on the activating, the collection, the storage and the transfer of the data in accordance with the restricted data mode as opposed to another data mode of the different data modes.

Additionally, or alternatively, in response to the determination that the context corresponds to the security restricted context method 1000 can further comprise selecting a data mode tailored to the restricted security context from amongst a plurality of different data modes configured for the vehicle, wherein the data mode corresponds to a restricted data mode that comprises one or more settings which control at least one of, collection of the data via the one or more data collection devices, storage of the data via a local memory onboard the vehicle and an external memory, or transfer of the data to an external system or device, in accordance with the one or more restrictions. With these embodiments, method 1000 can further comprise rendering, via the electronic output device, recommendation data recommending activation of the restricted data mode. In addition, method 1000 can further comprise activating the restricted data mode in response to reception of user input, via an electronic input device located on or within the vehicle, requesting the activation of the restricted data mode, and controlling, based on the activating, the collection, the storage and the transfer of the data in accordance with the restricted data mode as opposed to another data mode of the different data modes.

In accordance with either of these embodiments, in some implementations, method 1000 can also comprise tracking information regarding the vehicle context corresponding to the restricted security context and activation and deactivation of the restricted data mode in at least one of the local memory or the external memory.

In one or more embodiments, in some implementations, the context component determines that the context of the vehicle corresponds to the restricted security context based on a location of the vehicle being associated with a security restricted arca (e.g., using data security/privacy map information 406 and/or various techniques discussed herein). With these embodiments, based on determining that the vehicle is associated with the security restricted area (e.g., located within or about to be located within), method 1000 can comprise controlling, at least one of, collection of the data via the one or more data collection devices, storage of the data via a local memory onboard the vehicle and/or an external memory, or transfer of the data to an external system or device, in accordance with a second data mode tailored to account for the one or more restrictions associated with the security restricted area as opposed to a first data mode not tailored to account for the one or more restrictions. Method 1000 can further comprise detecting when the context of the vehicle no longer corresponds to the restricted security context based on a distance between the vehicle and a position of a reference object located within the security restricted area exceeding a threshold distance (and/or based on the vehicle moving past and detecting an RFID marking a boundary of the security restricted area), and thereafter controlling, based on the detecting, the collection, the storage, and the transfer of the data in accordance with the first data mode or a third data mode as opposed to a second data mode.

FIG. 11 illustrates a block flow diagram of another example, non-limiting computer-implemented method 1100 for adaptive data collection in vehicles for enhanced privacy and data security, in accordance with one or more embodiments described herein. With reference to FIG. 11 in view of FIGS. 1-7, method 1100 corresponds to an example computer-implemented method that can be performed by the data processing device 106 of vehicle 102. In this regard, at 1102, method 1100 comprises receiving (e.g., via configuration component 502), input from an occupant of the vehicle requesting usage of a particular a restricted data setting that restricts one or more function of the vehicle with respect to collection of data via one or more data collection devices onboard the vehicle, storage of the data and/or transfer of the data to an external system or device. At 1104, method 1100 comprises determining, (e.g., via safety regulation component 704), a risk level associated with usage of the restricted data setting based on the context of the vehicle. At 1106, the system assesses whether the risk level exceeds a threshold risk level (e.g., via the safety regulation component 704). If the risk level exceeds the threshold risk level, then method 1100 proceeds to 1108, wherein the data processing device 106 controls the collection, the storage and/or the transfer of the data in accordance with a modified data setting that accounts for one or more safety risks associated with the context of the vehicle. However, if at 1106 the risk level does not exceed the threshold risk level, then method 1100 continues to 1110, wherein the data processing device controls the collection, the storage and/or the transfer of the data in accordance with the restricted data setting.

One or more embodiments can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. To this end, a computer readable storage medium, a machine-readable storage medium, or the like as used herein can include a non-transitory computer readable storage medium, a non-transitory machine-readable storage medium, and the like.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 12, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 12:
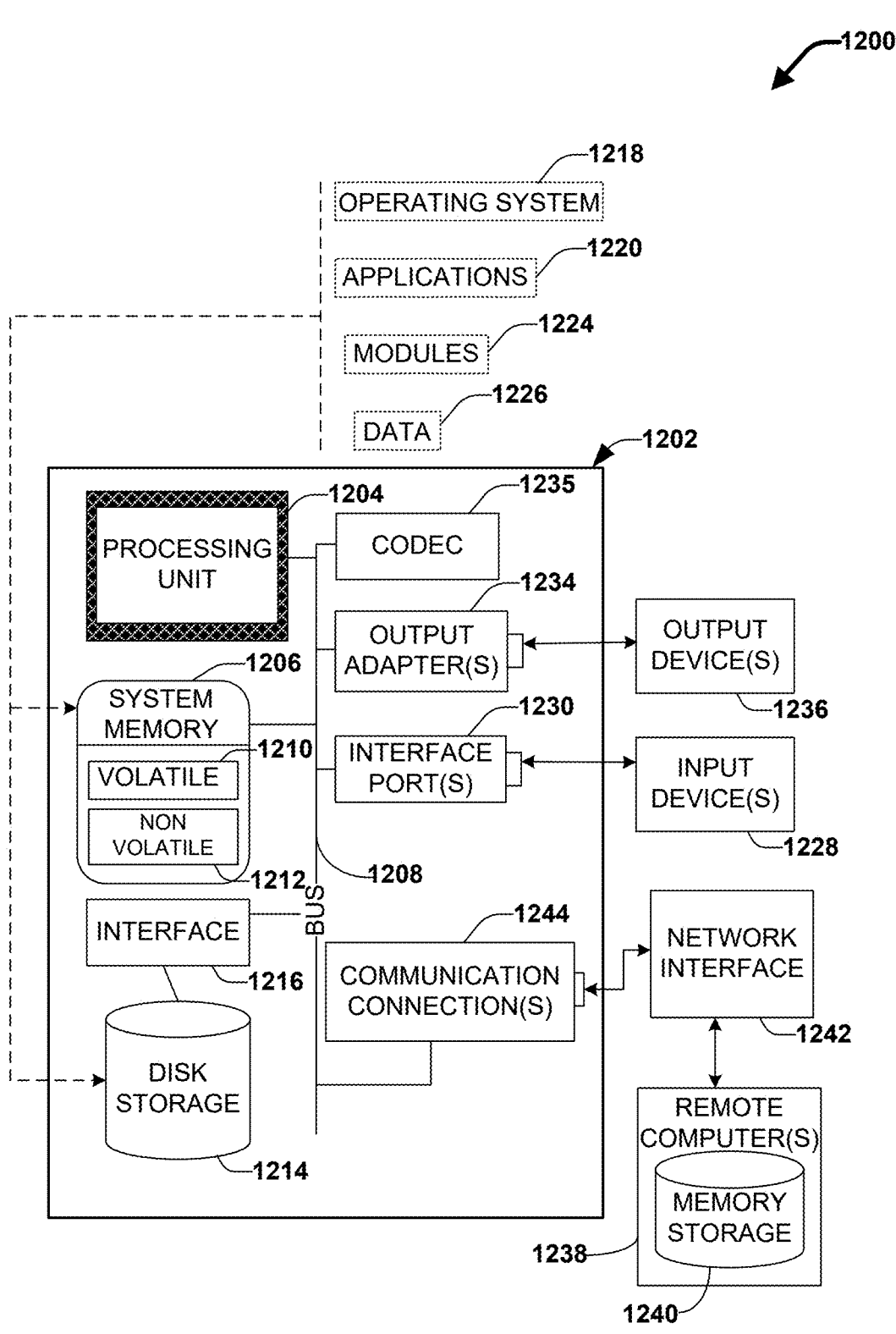
FIG. 12 is an example, non-limiting computing environment in which one or more embodiments described herein can be implemented.

With reference to FIG. 12, an example environment 1200 for implementing various aspects of the claimed subject matter includes a computer 1202. The computer 1202 includes a processing unit 1204, a system memory 1206, a codec 1235, and a system bus 1208. The system bus 1208 couples system components including, but not limited to, the system memory 1206 to the processing unit 1204. The processing unit 1204 can be any of various available processors. Dual microprocessors and other multiprocessor architectures also can be employed as the processing unit 1204.

The system bus 1208 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1384), and Small Computer Systems Interface (SCSI).

The system memory 1206 includes volatile memory 1210 and non-volatile memory 1212, which can employ one or more of the disclosed memory architectures, in various embodiments. The basic input/output system (BIOS), containing the basic routines to transfer information between elements within the computer 1202, such as during start-up, is stored in non-volatile memory 1212. In addition, according to present innovations, codec 1235 can include at least one of an encoder or decoder, wherein the at least one of an encoder or decoder can consist of hardware, software, or a combination of hardware and software. Although, codec 1235 is depicted as a separate component, codec 1235 can be contained within non-volatile memory 1212. By way of illustration, and not limitation, non-volatile memory 1212 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1212 can employ one or more of the disclosed memory devices, in at least some embodiments. Moreover, non-volatile memory 1212 can be computer memory (e.g., physically integrated with computer 1202 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1210 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1202 can also include removable/non-removable, volatile/non-volatile computer storage medium. FIG. 12 illustrates, for example, disk storage 1214. Disk storage 1214 includes, but is not limited to, devices like a magnetic disk drive, solid state disk (SSD), flash memory card, or memory stick. In addition, disk storage 1214 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1214 to the system bus 1208, a removable or non-removable interface is typically used, such as interface 1216. It is appreciated that disk storage 1214 can store information related to a user. Such information might be stored at or provided to a server or to an application running on a user device. In one embodiment, the user can be notified (e.g., by way of output device(s) 1236) of the types of information that are stored to disk storage 1214 or transmitted to the server or application. The user can be provided the opportunity to opt-in or opt-out of having such information collected or shared with the server or application (e.g., by way of input from input device(s) 1228).

It is to be appreciated that FIG. 12 describes software that acts as an intermediary between users and the basic computer resources described in the suitable operating environment 1200. Such software includes an operating system 1210. Operating system 1210, which can be stored on disk storage 1214, acts to control and allocate resources of the computer 1202. Applications 1220 take advantage of the management of resources by operating system 1210 through program modules 1224, and program data 1226, such as the boot/shutdown transaction table and the like, stored either in system memory 1206 or on disk storage 1214. It is to be appreciated that the claimed subject matter can be implemented with various operating systems or combinations of operating systems.

A user enters commands or information into the computer 1202 through input device(s) 1228. Input devices 1228 include, but are not limited to, a pointing device such as a mouse, trackball, stylus, touch pad, touchscreen, keyboard, microphone, joystick, game pad, satellite dish, scanner, TV tuner card, digital camera, digital video camera, web camera, and the like. These and other input devices connect to the processing unit 1204 through the system bus 1208 via interface port(s) 1230. Interface port(s) 1230 include, for example, a serial port, a parallel port, a game port, and a universal serial bus (USB). Output device(s) 1236 use some of the same type of ports as input device(s) 1228. Thus, for example, a USB port can be used to provide input to computer 1202 and to output information from computer 1202 to an output device 1236. Output adapter 1234 is provided to illustrate that there are some output devices 1236 like monitors/displays, speakers, and printers, among other output devices 1236, which require special adapters. The output adapters 1234 include, by way of illustration and not limitation, video and sound cards that provide a means of connection between the output device 1236 and the system bus 1208. It should be noted that other devices or systems of devices provide both input and output capabilities such as remote computer(s) 1238.

Computer 1202 can operate in a networked environment using logical connections to one or more remote computers, such as remote computer(s) 1238. The remote computer(s) 1238 can be a personal computer, an onboard vehicle computer, a communication device (e.g., a mobile phone, a smartphone, a smartwatch, a wearable device, etc.), a server, a router, a network PC, a workstation, a microprocessor based appliance, a peer device, a smart phone, a tablet, or other network node, and typically includes many of the elements described relative to computer 1202. For purposes of brevity, only a memory storage device 1240 is illustrated with remote computer(s) 1238. Remote computer(s) 1238 is logically connected to computer 1202 through a network interface 1242 and then connected via communication connection(s) 1244. Network interface 1242 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1244 refers to the hardware/software employed to connect the network interface 1242 to the bus 1208. While communication connection 1244 is shown for illustrative clarity inside computer 1202, it can also be external to computer 1202. The hardware/software necessary for connection to the network interface 1242 includes, for exemplary purposes only, internal and external technologies such as, modems including regular telephone grade modems, cable modems and DSL modems, ISDN adapters, and wired and wireless Ethernet cards, hubs, and routers.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

Figure 13:
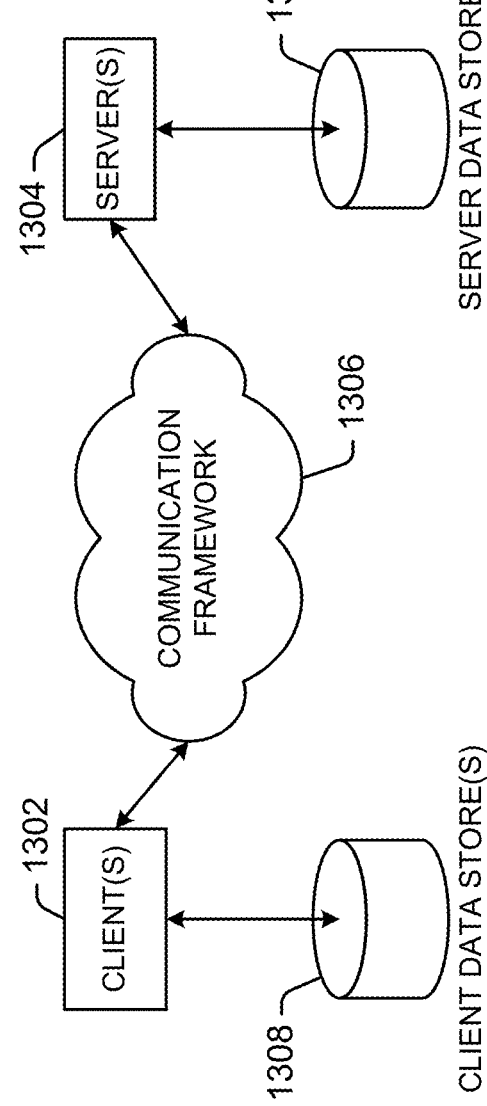
FIG. 13 is an example, non-limiting networking environment in which one or more embodiments described herein can be implemented.

Referring now to FIG. 13, there is illustrated a schematic block diagram of a computing environment 1300 in accordance with this specification. The system 1300 includes one or more client(s) 1302, (e.g., computers, smart phones, tablets, cameras, PDA's). The client(s) 1302 can be hardware and/or software (e.g., threads, processes, computing devices). The client(s) 1302 can house cookie(s) and/or associated contextual information by employing the specification, for example.

The system 1300 also includes one or more server(s) 1304. The server(s) 1304 can also be hardware or hardware in combination with software (e.g., threads, processes, computing devices). The servers 1304 can house threads to perform transformations of media items by employing aspects of this disclosure, for example. One possible communication between a client 1302 and a server 1304 can be in the form of a data packet adapted to be transmitted between two or more computer processes wherein data packets may include coded analyzed headspaces and/or input. The data packet can include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304. Further, the client(s) 1302 can be operatively connected to one or more server data store(s) 1310.

In one exemplary implementation, a client 1302 can transfer an encoded file, (e.g., encoded media item), to server 1304. Server 1304 can store the file, decode the file, or transmit the file to another client 1302. It is noted that a client 1302 can also transfer uncompressed file to a server 1304 and server 1304 can compress the file and/or transform the file in accordance with this disclosure. Likewise, server 1304 can encode information and transmit the information via communication framework 1306 to one or more clients 1302.

The illustrated aspects of the disclosure can also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature can be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive-in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further aspects of the invention are provided by the subject matter of the following clauses:

1. A computer-implemented method performed by a data processing device of a vehicle, comprising:
selecting a data mode regarding data capable of being collected via one or more data collection devices integrated on or within the vehicle, wherein the data settings component selects the data mode from amongst a plurality of different data modes configured for the vehicle that vary with respect to one or more settings selected from the group consisting of: a collection setting that controls collection of the data via the one or more data collection devices, a storage setting that controls storage of the data via at least one of a local memory onboard the vehicle and an external memory communicably connected to the data processing device, and a transfer setting that controls transfer of the data to an external system or device; and
controlling the collection, the storage, and the transfer of the data in accordance with the data mode, as opposed to another data mode of the different data modes, based on the selecting.

2. The method of clause 1, wherein the selecting comprises selecting the data mode in response to reception, via an electronic input device located on or within the vehicle and communicatively coupled to the data processing device, of user input requesting activation of the data mode.

3. The method of clause 2, further comprising:
rendering, via an electronic output device located on or within the vehicle and communicatively coupled to the data processing device, information identifying the different data modes, and wherein the user input comprises selection input selecting the data mode from the information.

4. The method of clause 1, further comprising:
determining and monitoring determines a context of the vehicle, wherein the selecting comprises selecting the data mode based on the data mode being applicable to the context of the vehicle, and wherein the different data modes are tailored to different vehicle contexts.

5. The method of clause 4, wherein the different vehicle contexts account for different locations and different times.

6. The method of clause 4, wherein the different vehicle contexts account for different occupants of the vehicle and different preferences of the different occupants.

7. The method of clause 1, wherein the different data modes comprise at least one user defined data mode tailored to an occupant of the vehicle, and wherein the method further comprises:
facilitating receiving, via an electronic input device communicatively coupled to the data processing device, user input from the occupant defining the one or more settings for the user defined data mode.

8. The method of clause 1, wherein the different data modes comprise three or more different data modes.

9. The method of clause 1, wherein the different data modes vary with respect to one or more sub-settings of the collection setting, the storage setting, or the transfer setting.

10. The method of clause 1, wherein the one or more data collection devices comprise one or more cameras integrated on or within the vehicle, and wherein the collection setting comprises one or more camera settings selected from another group consisting of: an activation/deactivation setting that controls activation and deactivation of capture of the image data from respective cameras of the one or more cameras, a capture amount setting that controls an amount of the image data captured from the respective cameras, and capture mode setting that controls a capture mode of the image data captured via the respective cameras.

11. The method of clause 10, wherein one or more cameras comprise an interior camera having a perspective of an interior cabin of the vehicle, and wherein based on the data mode having a camera setting deactivating capture of the image data via the interior camera, the method further comprises:

configuring the interior camera to operate in a mirror mode.

12. The method of clause 1, wherein the one or more data collection devices comprise a location detection device that collects location data regarding a location and route of the vehicle, and wherein the collection setting controls activation and deactivation of the location detection device and a type of the location data collected.

13. The method of clause 1, wherein the one or more data collection devices comprise one or more sensors that collect sensor data associated with the vehicle, and wherein the collection setting controls activation and deactivation of respective sensors of the one or more sensors.

14. The method of clause 1, wherein the storage setting comprises different storage settings that control whether the data is stored in the memory or not, a duration of time over which the data is stored in the memory, and whether the data is stored in the external memory or not.

15. The method of clause 1, wherein the transfer setting comprises different transfer settings that control whether and when the data is transferred to the external system or device, or not transferred to the external system or device, and that control different external systems to which the data is transferred or not transferred.

16. The method of clause 1, further comprising:

monitoring a risk level associated with operation of the vehicle in association with the data mode corresponding to a restricted data mode having one or more data collection settings that deactivate the collection of the data by the control component; and based on a determination that the risk level exceeds a threshold risk level, temporarily overriding the restricted data mode and activating the collection of the data until the risk level falls below the threshold risk level.

The method of clause 1 above with any set of combinations of the method of clauses 2-16 above.

A system configured to perform the method of any one or set of combinations of the method of clauses 1-16 above.

A vehicle comprising the data processing device and configured to perform the method of any one or set of combinations of the method of clauses 1-16 above.

A non-transitory machine-readable storage medium comprising executable instructions that, when executed by a data processing device onboard a vehicle, facilitate performance of the method of any one or set of combinations of the clauses 1-16 above.

17. A computer-implemented method performed by a data processing device of a vehicle, comprising:

determining whether a context of the vehicle corresponds to a security restricted context associated with one or more restrictions related to data capable of being collected via one or more data collection devices integrated on or within the vehicle and communicatively coupled to the data processing device; and in response to a determination that the context corresponds to the security restricted context, rendering, via an electronic output device located on or within the vehicle and communicatively coupled to the data processing device, notification data informing one or more occupants of the vehicle that the context of the vehicle corresponds to the restricted security context.

18. The method of clause 17, further comprising, in response to the determination that the context corresponds to the security restricted context:

selecting a data mode tailored to the restricted security context from amongst a plurality of different data modes configured for the vehicle, wherein the data mode corresponds to a restricted data mode that comprises one or more settings which control at least one of, collection of the data via the one or more data collection devices, storage of the data via at least one of a local memory onboard the vehicle and an external memory communicably connected to the data processing device, or transfer of the data to an external system or device, in accordance with the one or more restrictions;

activating the restricted data mode based on the selecting; and controlling/causing based on the activating, the collection, the storage, and the transfer of the data in accordance with the restricted data mode as opposed to another data mode of the different data modes.

19. The method of clause 18, further comprising:

tracking information regarding the vehicle context corresponding to the restricted security context and activation and deactivation of the restricted data mode in at least one of the local memory or the external memory.

20. The method of clause 17, further comprising, in response to the determination that the context corresponds to the security restricted context:

selecting a data mode tailored to the restricted security context from amongst a plurality of different data modes configured for the vehicle, wherein the data mode corresponds to a restricted data mode that comprises one or more settings which control at least one of, collection of the data via the one or more data collection devices, storage of the data via at least one of a local memory onboard the vehicle and an external memory communicably connected to the data processing device, or transfer of the data to an external system or device, in accordance with the one or more restrictions; and rendering, via the electronic output device, recommendation data recommending activation of the restricted data mode.

21. The method of clause 20, further comprising:

activating the restricted data mode in response to reception of user input, via an electronic input device located on or within the vehicle, requesting the activation of the restricted data mode; and controlling/causing based on the activating, the collection, the storage, and the transfer of the data in accordance with the restricted data mode as opposed to another data mode of the different data modes.

22. The method of clause 21, further comprising:

tracking information regarding the vehicle context corresponding to the restricted security context and activation and deactivation of the restricted data mode in at least one of the local memory or the external memory.

23. The method of clause 17, further comprising:

determining that the context of the vehicle corresponds to the restricted security context based on a location of the vehicle being associated with a security restricted area; and controlling/causing based on the determining, at least one of, collection of the data via the one or more data collection devices communicably connected to the data processing device, storage of the data via at least one of a local memory onboard the vehicle and an external memory communicably connected to the data processing device, or transfer of the data to an external system or device, in accordance with a second data mode tailored to account for the one or more restrictions as opposed to a first data mode not tailored to account for the one or more restrictions.

24. The method of clause 23, further comprising:

monitoring the context of the vehicle in association with usage of the second data mode;

detecting, based on the monitoring, when the context of the vehicle no longer corresponds to the restricted security context; and controlling based on the detecting, the collection, the storage, and the transfer of the data in accordance with the first data mode or a third data mode as opposed to a second data mode.

25. The method of clause 24, wherein the determining that the context of the vehicle no longer corresponds to the restricted security context is based on a distance between the vehicle and a position of a reference object located within the security restricted area exceeding a threshold distance.

26 The method of clause 24, wherein the determining that the context of the vehicle no longer corresponds to the restricted security context is based on movement of the vehicle past a radio frequency identification device marking a boundary of the security restricted area.

27. The method of clause 23, further comprising:

monitoring a risk level associated with operation of the vehicle in association with usage of the second data mode and the second data mode having one or more data collection settings that deactivate the collection of the data by the data processing device; and based on a determination that the risk level exceeds a threshold risk level, directing the data processing device to temporarily override the second data mode and activate the collection of the data until the risk level falls below the threshold risk level.

28. The method of clause 17, wherein the determining whether the context of the vehicle corresponds to the restricted security context is based on a location of the vehicle and a time at which the vehicle is at the location.

29. The method of clause 17, wherein the determining that the context of the vehicle corresponds to the restricted security context is based on one or more occupants of the vehicle and privacy preferences associated with the one or more occupants.

30. The method of clause 17, wherein the one or more data collection devices comprise one or more cameras located on or within the vehicle, one or more location tracking devices located on or within the vehicle, and one or more sensors located on or within the vehicle.

The method of clause 17 above with any set of combinations of the method of clauses 18-30 above.

A system configured to perform the method of any one or set of combinations of the method of clauses 17-30 above.

A vehicle comprising the data processing device and configured to perform the method of any one or set of combinations of the method of clauses 17-30 above.

A non-transitory machine-readable storage medium comprising executable instructions that, when executed by a data processing device onboard a vehicle, facilitate performance of the method of any one or set of combinations of the clauses 17-30 above.

What is claimed is:

1. A computer-implemented method performed by a data processing device of a vehicle, comprising:

determining whether a context of the vehicle corresponds to a security restricted context associated with one or more restrictions related to data capable of being collected via one or more data collection devices integrated on or within the vehicle and communicatively coupled to the data processing device; and in response to a determination that the context of the vehicle corresponds to the security restricted context:

selecting a data mode tailored to the security restricted context from amongst a plurality of different data modes configured for the vehicle, wherein the data mode corresponds to a restricted data mode that comprises one or more settings which control, in accordance with the one or more restrictions, at least one of:

collection of the data via the one or more data collection devices, storage of the data via at least one of a local memory onboard the vehicle and an external memory communicably connected to the data processing device, or transfer of the data to at least one of an external system or device; and rendering, via an electronic output device located on or within the vehicle and communicatively coupled to the data processing device, notification data informing one or more occupants of the vehicle that the context of the vehicle corresponds to the security restricted context, wherein the notification data comprises recommendation data recommending activation of the restricted data mode.

2. The method of claim 1, further comprising:

activating the restricted data mode in response to reception of user input, via an electronic input device located on or within the vehicle, requesting the activation of the restricted data mode; and controlling/causing based on the activating, the collection, the storage, and the transfer of the data in accordance with the restricted data mode as opposed to another data mode of the different data modes.

3. The method of claim 2, further comprising:

tracking information regarding the context of the vehicle corresponding to the security restricted context and activation and deactivation of the restricted data mode in at least one of the local memory or the external memory.

4. The method of claim 1, further comprising:
determining that the context of the vehicle corresponds to the security restricted context based on a location of the vehicle being associated with a security restricted area;
controlling, based on the determining, at least one of, collection of the data via the one or more data collection devices communicably connected to the data processing device, storage of the data via at least one of local memory or the external memory, or transfer of the data to the external system or device, in accordance with a second data mode tailored to account for the one or more restrictions as opposed to a first data mode not tailored to account for the one or more restrictions.

5. The method of claim 4, further comprising:
monitoring the context of the vehicle in association with usage of the second data mode;
detecting, based on the monitoring, when the context of the vehicle no longer corresponds to the security restricted context; and
controlling based on the detecting, the collection, the storage, and the transfer of the data in accordance with the first data mode or a third data mode as opposed to the second data mode.

6. The method of claim 5, wherein the determining that the context of the vehicle no longer corresponds to the security restricted context is based on a distance between the vehicle and a position of a reference object located within the security restricted area exceeding a threshold distance.

7. The method of claim 5, wherein the determining that the context of the vehicle no longer corresponds to the security restricted context is based on movement of the vehicle past a radio frequency identification device marking a boundary of the security restricted area.

8. The method of claim 4, further comprising:
monitoring a risk level associated with operation of the vehicle in association with usage of the second data mode and the second data mode having one or more data collection settings that deactivate the collection of the data by the data processing device; and
based on a determination that the risk level exceeds a threshold risk level, directing the data processing device to temporarily override the second data mode and activate the collection of the data until the risk level falls below the threshold risk level.

9. The method of claim 1, wherein the determining whether the context of the vehicle corresponds to the security restricted context is based on a location of the vehicle and a time at which the vehicle is at the location.

10. The method of claim 1, wherein the determining that the context of the vehicle corresponds to the security restricted context is based on the one or more occupants of the vehicle and privacy preferences associated with the one or more occupants.

11. The method of claim 1, wherein the one or more data collection devices comprise one or more cameras located on or within the vehicle, one or more location tracking devices located on or within the vehicle, and one or more sensors located on or within the vehicle.

12. A system onboard a vehicle, comprising:
a memory that stores computer executable components; and
a processor that executes at least one of the computer executable components that:
determines whether a context of the vehicle corresponds to a security restricted context associated with one or more restrictions related to data capable of being collected via one or more data collection devices integrated on or within the vehicle; and
in response to a determination that the context of the vehicle corresponds to the security restricted context:
renders, via an electronic output device located on or within the vehicle, notification data informing one or more occupants of the vehicle that the context of the vehicle corresponds to the security restricted context;
selecting a data mode tailored to the security restricted context from amongst a plurality of different data modes configured for the vehicle, wherein the data mode corresponds to a restricted data mode that comprises one or more settings which control, in accordance with the one or more restrictions, at least one of:
collection of the data via the one or more data collection devices,
storage of the data via at least one of a local memory onboard the vehicle and an external memory communicably connected to the processor, or
transfer of the data to at least one of an external system or device; and
activates the restricted data mode; and
controls the collection, the storage and the transfer of the data in accordance with the restricted data mode as opposed to another data mode of the different data modes.

13. The system of claim 12, wherein the at least one of the computer executable components further:
tracks information regarding the context of the vehicle corresponding to the security restricted context and activation and deactivation of the restricted data mode in at least one of the memory or the external memory.

14. The system of claim 12, wherein the notification data comprises recommendation data recommending activation of the restricted data mode, and
wherein the at least one of the computer executable components activates the restricted data mode in response to reception of user input, via an electronic input device located on or within the vehicle, requesting the activation of the restricted data mode.

15. The system of claim 12, wherein the at least one of the computer executable components further:
determines that the context of the vehicle corresponds to the security restricted context based on a location of the vehicle being associated with a security restricted area;
controls, based on the determining, in accordance with a second data mode tailored to account for the one or more restrictions as opposed to a first data mode not tailored to account for the one or more restrictions, at least one of:
collection of the data via the one or more data collection devices,
storage of the data via at least one of the local memory or the external memory, or
transfer of the data to at least one of the external system or device.

16. A non-transitory machine-readable medium, comprising executable instructions that, when executed by a processor onboard a vehicle, facilitate performance of operations, comprising:
determining whether a context of the vehicle corresponds to a security restricted context associated with one or more restrictions related to data capable of being collected via one or more data collection devices integrated on or within the vehicle; and in response to a determination that the context of the vehicle corresponds to the security restricted context based on a location of the vehicle being associated with a security restricted area:

rendering, via an electronic output device located on or within the vehicle, notification data informing one or more occupants of the vehicle that the context of the vehicle corresponds to the security restricted context, and controlling, based on the determining, in accordance with a second data mode tailored to account for the one or more restrictions as opposed to a first data mode not tailored to account for the one or more restrictions, at least one of:

collection of the data via the one or more data collection devices, storage of the data via at least one of a local memory onboard the vehicle or an external memory, or transfer of the data to at least one of an external system or device.

17. The non-transitory machine-readable medium of claim 16, where the operations further comprise:

monitoring the context of the vehicle in association with usage of the second data mode;

detecting, based on the monitoring, when the context of the vehicle no longer corresponds to the security restricted context; and controlling based on the detecting, the collection, the storage, and the transfer of the data in accordance with the first data mode or a third data mode as opposed to the second data mode.

18. The non-transitory machine-readable medium of claim 17, wherein the determining that the context of the vehicle no longer corresponds to the security restricted context is based on a distance between the vehicle and a position of a reference object located within the security restricted area exceeding a threshold distance.

19. The non-transitory machine-readable medium of claim 17, wherein the determining that the context of the vehicle no longer corresponds to the security restricted context is based on movement of the vehicle past a radio frequency identification device marking a boundary of the security restricted area.

20. The non-transitory machine-readable medium of claim 16, where the operations further comprise:

monitoring a risk level associated with operation of the vehicle in association with usage of the second data mode and the second data mode having one or more data collection settings that deactivate the collection of the data; and based on a determination that the risk level exceeds a threshold risk level, temporarily overriding the second data mode and activate the collection of the data until the risk level falls below the threshold risk level.

* * * * *